United States Patent [19]

Pirz et al.

[11] 4,181,821

[45] Jan. 1, 1980

[54] MULTIPLE TEMPLATE SPEECH RECOGNITION SYSTEM

[75] Inventors: Frank C. Pirz, Madison Township, Morris County; Lawrence R. Rabiner, Berkeley Heights, both of N.J.

[73] Assignee: Bell Telephone Laboratories, Incorporated, Murray Hill, N.J.

[21] Appl. No.: 956,438

[22] Filed: Oct. 31, 1978

[51] Int. Cl.$^2$ .............................................. G10L 1/00
[52] U.S. Cl. .................................................. 179/1 SD
[58] Field of Search ................ 179/1 SD, 1 SB, 1 SC; 340/146.3 AQ, 146.3 WD, 146.3 CA

[56] References Cited

U.S. PATENT DOCUMENTS

| | | | |
|---|---|---|---|
| 3,521,235 | 7/1970 | Becker | 340/146.3 |
| 3,770,892 | 11/1973 | Clapper | 179/1 |
| 4,028,674 | 6/1977 | Chuang | 340/146.3 |
| 4,060,694 | 11/1977 | Suzuki et al. | 179/1 |
| 4,069,393 | 1/1978 | Martin et al. | 179/1 |

OTHER PUBLICATIONS

G. Thaker et al., "Comparison of Fast Fourier etc.," Proc. of Southeastern Conf. on Imaginative Eng., 1977.
R. Christiansen et al., "Word Spotting in Continuous Speech etc.," IEEE Int'l Conf. on Acoustics, 1976.

*Primary Examiner*—Malcolm A. Morrison
*Assistant Examiner*—E. S. Kemeny
*Attorney, Agent, or Firm*—Jack S. Cubert

[57] ABSTRACT

A speech analyzer for recognizing an unknown utterance as one of a set of reference words is adapted to generate a feature signal set for each utterance of every reference word. At least one template signal is produced for each reference word which template signal is representative of a group of feature signal sets. Responsive to a feature signal set formed from the unknown utterance and each reference word template signal, a signal representative of the similarity between the unknown utterance and the template signal is generated. A plurality of similarity signals for each reference word is selected and a signal corresponding to the average of said selected similarity signals is formed. The average similarity signals are compared to identify the unknown utterance as the most similar reference word. Features of the invention include: template formation by successive clustering involving partitioning feature signal sets into groups of predetermined similarity by centerpoint clustering, and recognition by comparing the average of selected similarity measures of a time-warped unknown feature signal set with the cluster-derived reference templates for each vocabulary word.

26 Claims, 23 Drawing Figures

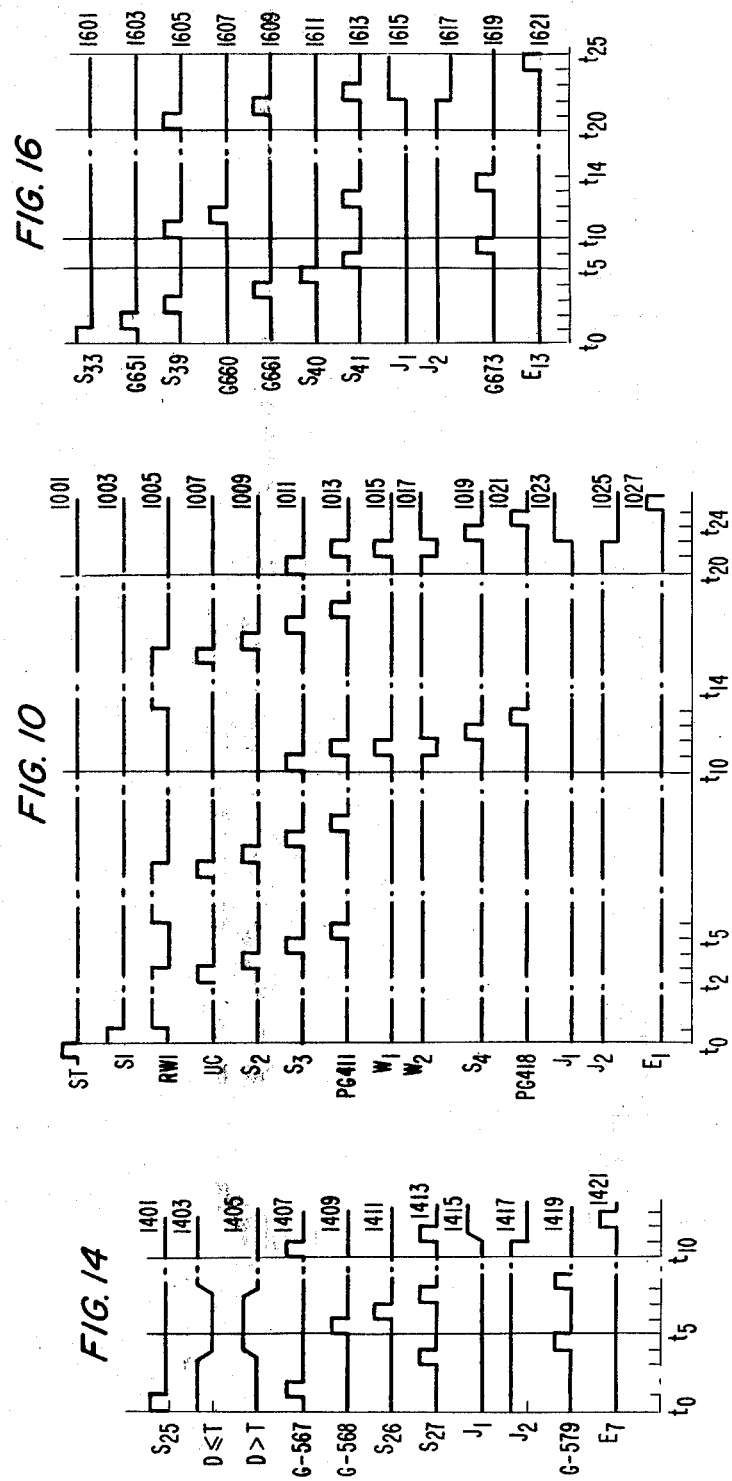

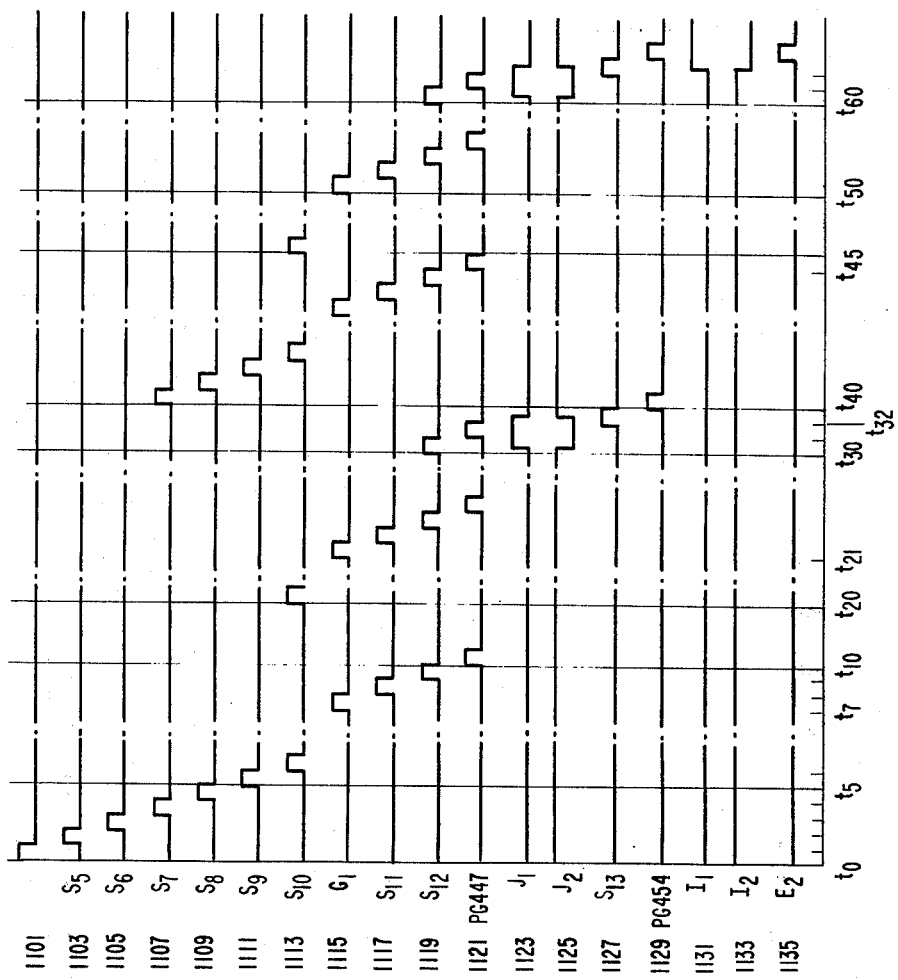

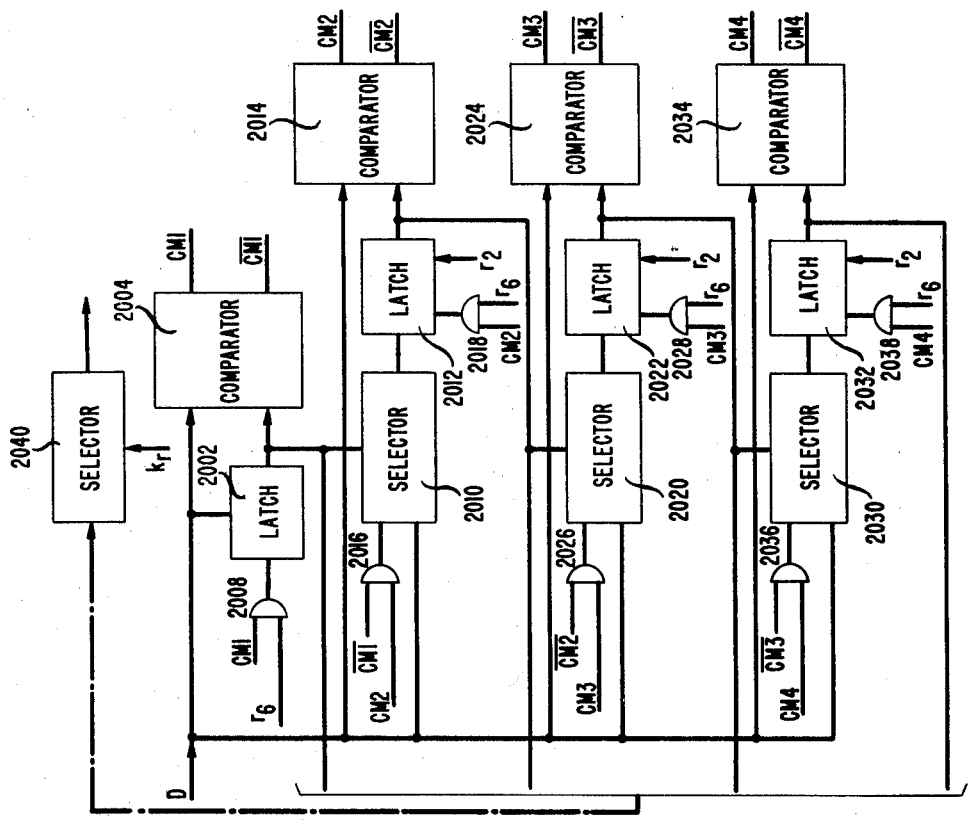
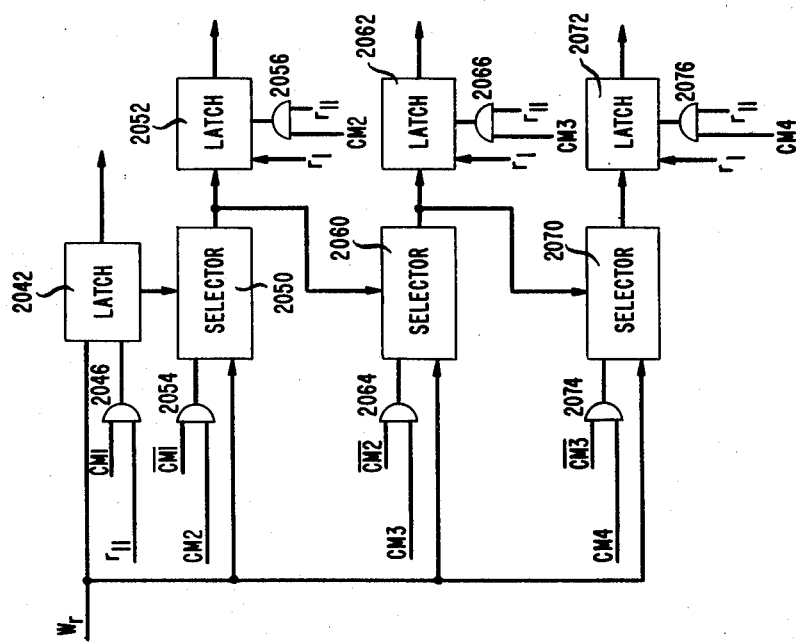
FIG. 20

MULTIPLE TEMPLATE SPEECH RECOGNITION SYSTEM

Our invention relates to speech recognition systems and, more particularly, to arrangements for recognizing an utterance as one of a plurality of reference words.

In many processing, control and communication systems, it is advantageous to use speech signals as input for information, data and commands. Speech input may be utilized to record transaction data or to request directory information over telephone connections where digital encoding devices are not readily available. Direct speech input may be used to control the operation of machine tools or to permit an operator to interact with data processing or control equipment by voice without interrupting other activities. In order to obtain data or command signals from a spoken utterance, the utterance must be recognized by processing equipment as a particular word or phrase. The accurate recognition of speech signals, however, is difficult, owing to the complexity and redundancy of the speech signal, the considerable variability of the speech signal from speaker to speaker and the variability even for a particular speaker.

In many known speech recognition systems, an input utterance is analyzed to provide a set of feature signals characteristic of the utterance. Such feature signals may be derived from spectral analysis or linear prediction analysis of the utterance. Initially, the recognition apparatus is trained through the use of input utterances of identified reference words. Each input utterance of a known word is analyzed to provide a set of reference feature signals, which signals are stored. Subsequent to the storage of the feature signal sets for all reference words to be recognized by the system, an unknown utterance is analyzed and a set of feature signals representative of the unknown utterance is obtained. These unknown utterance feature signals are compared with the stored reference word feature signals to determine the degree of correspondence therebetween. After the comparisons are completed, the unknown utterance is identified as the reference word whose feature signals most closely correspond to the feature signals of the unknown utterance.

When the reference feature signals and the unknown utterance feature signals are obtained from the same speaker, the identification of the unknown utterance may be determined with a fair degree of accuracy. Such speaker-dependent recognition arrangements include apparatus to compensate for the variability in utterance duration and utilize recognition criteria adapted to compensate for variability in speech patterns. Where, however, the reference and unknown utterances are obtained from different speakers, the variability among the speakers causes the recognition to be substantially less accurate.

In speaker-independent word recognition systems wherein the utterance to be recognized may be provided by any speaker, a reference feature signal set may be obtained by averaging the feature signal sets obtained from a plurality of speakers as disclosed in U.S. Pat. No. 4,092,493, issued May 30, 1978 to L. R. Rabiner and M. Sambur. The average feature signal set is stored and utilized as a reference template for later recognition of unknown utterances. The individual reference feature signal sets used in the averaging, however, may be greatly divergent. Consequently, the averaged reference template derived therefrom may not be representative for more than a few speakers. For example, the averge feature signal set formed for both the class of adult male speakers and the class of female and juvenile speakers can result in a reference template that is not representative of either class. The use of averaged reference templates has therefore required verification that the average is representative each time a new speaker is considered and manual adjustment of the characteristics to make the average representative as disclosed in the article "Dynamic Speaker Adaptation in the Harpy Speech Recognition System" by Bruce T. Lowerre, 1977 *IEEE International Conference on Acoustics, Speech, and Signal Processing Record* pgs. 788-790.

An alternative speech recognition system, disclosed in the article, "Comparison of Fast Fourier and Fast Walsh Transform Methods in Speech Recognition Systems" by G. H. Thaker and J. N. Gowdy, *IEEE Proceedings of Southeast Conference* 1977 *On Imaginative Engineering Through Education and Experiences,* 1977 pgs. 419-422 utilizes each reference feature set directly as a template for recognition of an unknown utterance and thereby avoids the inaccuracies due to the averaging of diverse reference feature sets. Such an arrangement, however, is relatively inefficient owing to the large number of comparisons required and because the arrangement ignores similarities among utterances of a reference word.

Clustering arrangements to partition feature vector sets have been utilized in many pattern recognition systems. U.S. Pat. No. 4,028,670, issued June 4, 1976 to Ping Chien Chuang, for example, discloses an automatic signature verification system in which normalized vectors representative of previously authenticated signatures of an individual are compared. Vectors having a prescribed degree of similarity are grouped in a cluster and a prototype vector is generated for each cluster by averaging the components of the vectors of the cluster. The differences between the prototype vectors and a vector obtained for the unauthenticated signature are analyzed to verify the unauthenticated signature. Clustering has been successfully used in pattern recognition where the number of features required for recognition is relatively small. In speech recognition, however, the number of features is very large even for utterances of single words and direct clustering of the large number of features requires an uneconomical amount of data processing.

In speaker independent word recognizers where multiple templates are utilized for each reference word, templates for different words may exhibit a marked degree of overlapping similarities so that direct comparison of the unknown utterance features to the templates results in an ambiguous identification of the unknown utterance. In the aforementioned Thaker et al. article, the templates are sequentially compared to the corresponding features of an unknown utterance and distance signals representative of the similarities between the unknown utterance and the templates are formed. Recognition is assigned to the reference word which occurs most often in the $k^{th}$ smallest distance signals. Because of the high degree of template variability and the overlapping of templates of different reference words, the $k^{th}$ nearest neighbor arrangement of Thaker et al. does not adequately remove the recognition ambiguity due to multiple template overlap.

SUMMARY OF THE INVENTION

The invention is directed to a speech analyzer for recognizing an unknown utterance as one of a set of reference words in which a set of feature signals is produced for each of a plurality of utterances of each reference word. Responsive to the feature signal sets of each reference word, at least one template signal is generated for the reference word. Each template signal is representative of a group of the reference word feature signal sets. A set of signals representative of the features of the unknown utterance are generated. Jointly responsive to the unknown utterance feature signal set and each reference word template signal, a set of signals each representative of the similarity between said unknown utterance feature signal set and the template signal is formed. A plurality of similarity signals is selected for each reference word and a signal corresponding to the average of said reference word selected similarity signals is produced. Responsive to the average similarity signals for all reference words, the unknown utterance is identified as the most similar reference word. In accordance with the invention, the selection of similarity signals for each reference word and the averaging of the selected similarity signals for each reference word substantially reduces recognition ambiguity due to template signal variability and overlapping.

In accordance wth one aspect of the invention, template signal generation includes partitioning the reference word feature signal sets of each reference word into clusters of sets having a predetermined degree of similarity and identifying a feature signal set in each cluster as a template signal representative of all feature signal sets in said cluster.

According to another aspect of the invention, the feature signal set for an utterance comprises the linear prediction parameters of the successive time frames of the utterance. A signal representative of the distance between the linear prediction parameters of the unknown utterance and the linear prediction parameters of each template is produced. For each reference word, a plurality of the smallest distance signals is selected and a signal corresponding to the average of the selected distance signals is formed. The unknown utterance is identified as the reference word having the smallest average distance signal.

According to yet another aspect of the invention, the partitioning of the reference word feature signal sets includes generating and storing a set of signals representative of the distances between all pairs of the reference word feature signal sets. Responsive to the stored distance signals, the centermost of the reference word feature signal sets is determined, and the feature signal sets which are within a predetermined distance of the centermost set are identified to a first group. Successive groups of feature signal sets are formed from said first group by repeatedly determining the centermost of the previous group identified feature signal sets and identifying only the feature signal sets within the predetermined distance of the just determined centermost set to the next group. Previously identified feature signal sets outside said predetermined distance of the just determined centermost set are reclassified as outlier feature signal sets. Responsive to all previously identified feature signal sets being within the predetermined distance of a just determined centermost set, the previously identified feature signal sets are identified to a cluster having a prescribed degree of similarity. The centermost feature signal set of the cluster is stored as the cluster template signal.

One difficulty in spoken word recognition results from extraneous sounds or noise such as breath noise at the end of an utterance. Said extraneous sounds substantially modify the feature signals of the end portion of the utterance whereby the accuracy of utterance identification by feature signal distance comparisons is reduced. According to yet another aspect of the invention, the generation of the signal representative of the distance between the feature signals of the unknown utterance and reference word template includes detection of the endpoint frame of the utterance and determination of the intermediate frame of the utterance at which the utterance speech signal energy from the intermediate frame to said endpoint frame is a predetermined portion of the total speech signal energy of the utterance. A first signal corresponding to the average frame distance between the unknown utterance feature signals and the reference template until the endpoint frame is formed as well as a second signal corresponding to the average frame distance between the unknown utterance feature signals and the reference template until the intermediate frame. The minimum of the first and second average frame distance signals is selected as the distance representative signal corresponding to the degree of similarity between the unknown utterance and the reference template whereby the effect of possible extraneous noise at the end of the unknown utterance is reduced.

DESCRIPTION OF THE DRAWING

FIGS. 10 through 17 show waveforms useful in illustrating the operation of the block diagram of FIGS. 2 and 3;

FIG. 20 shows a detailed block diagram of the sorter and store blocks of FIG. 18;

DETAILED DESCRIPTION

Figure 1:
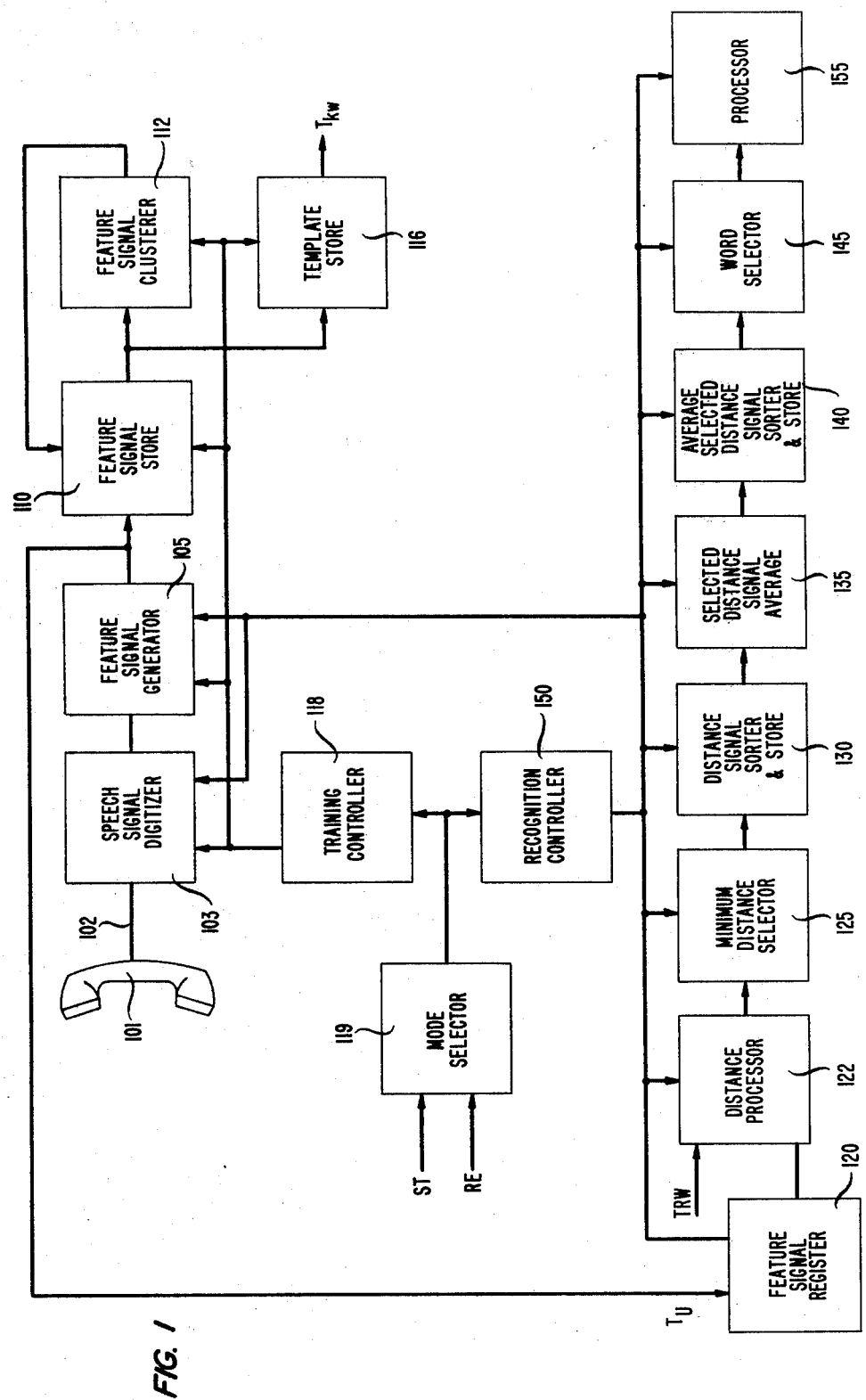
FIG. 1 depicts a general block diagram of a speech analyzer illustrative of the invention.

A general block diagram of a spoken word analyzer illustrative of the invention is shown in FIG. 1. The circuit of FIG. 1 is first operative in a training mode to form a plurality of templates for each reference word, which templates correspond to acoustic features of each reference word of the system. Each template includes a sequence of feature signals representative of a cluster of similar feature signal sets obtained for a plurality of utterances of the reference word. The training mode is illustrated in the flow chart shown in FIG. 9.

In the training mode, training controller 118 of FIG. 1 is activated responsive to training signal TR applied to mode selector 119. After training controller 118 is turned on, a speaker utters the set of identified reference words, one at a time, into the microphone of telephone handset 101 and the speech signal from the microphone is supplied to speech signal digitizer 103. Digitizer 103 is operative to lowpass filter the speech signal to remove unwanted frequency components (e.g., frequency components above 3 kHz) therefrom. The lowpass filtered signal is then succesively sampled at a prescribed rate, e.g., 6.67 kHz; and a digital code is formed for each speech signal sample.

The successive digital codes from digitizer 103 are applied to feature signal generator 105 which produces a set of linear prediction parameter signals for each 30 ms. frame of coded speech samples. The linear prediction parameters, as is well known in the art, are representative of the features of the frame segment of the speech signal. The prediction parameters $a_1, a_2, \ldots, a_p$ are in accordance with $$\hat{s}_n = \sum_{k=1}^{p} s_{n-k} a_k \qquad (1)$$

where p is the order of the predictor; $\hat{s}_n$ is the predicted value of the $n^{th}$ speech sample of the frame; $s_{n-k}$ are the coded speech samples; and $a_k$ is the $k^{th}$ prediction parameter signal.

The prediction parameter signals from the output of feature signal generator 105 are transferred to and stored in feature signal store 110 under control of training controller 118. Upon termination of the utterance of a reference word, the sequence of prediction parameter feature signals of the utterance are stored in a section of store 110 designated by the reference word code from controller 118. When the speaker has uttered the entire set of identified reference words and the feature sets corresponding thereto are in store 110, a new training mode is established for a different speaker. As indicated in box 901 of FIG. 9, feature signal sets are obtained for each reference word from a plurality of speakers preparatory to the recognition of an unknown utterance by the same or different speakers.

After a prescribed number of feature signal sets are obtained for different speakers, training controller 118 activates feature signal clusterer 112 and template store 116; and J feature signal sets $X_{1w}, X_{2w}, \ldots, X_{Jw}$ for each reference word (j=1, 2, ..., J, w=1, 2, ..., W) in store 110 are partitioned into groups of similar feature signal sets. A template set $T_{kw}$ is selected for each group (k=1, 2, ..., K), which template is representative of all feature signal sets in the group. The selected template $T_{kw}$ is stored in template store 116 for use in recognizing unknown utterances during subsequent recognition modes.

Feature signal clusterer 112 is adapted to determine the distance between each pair of feature signal sets (e.g., $X_{iw}, X_{jw}$ where i=1, 2, ..., J and j=1, 2, ..., J) for the reference word w on the basis of the well known dynamically time warped method $$D(X_{iw},X_{jw}) = \min_{\{v(n)\}} \sum_{n=1}^{N} d(X_{iw}(n),X_{jw}(v(n))) \qquad (2)$$

where N is the number of frames in word feature signal set $X_{iw}$, v(n) is the warping path which optimally relates the frame number n of $X_{iw}$ with frame number v (n) of $X_{jw}$, and $d(X_{iw}(n),X_{jw}(v(n)))$ is the frame distance between the $n^{th}$ frame of $X_{iw}$ and the $v(n)^{th}$ frame of $X_{jw}$ as described in the article "Minimum Prediction Residual Principle Applied to Speech Recognition", by F. Itakura, IEEE Transactions on Acoustics, Speech and Signal Processing, Vol. ASSP-23, pp. 67–72, February 1975.

Figure 9:
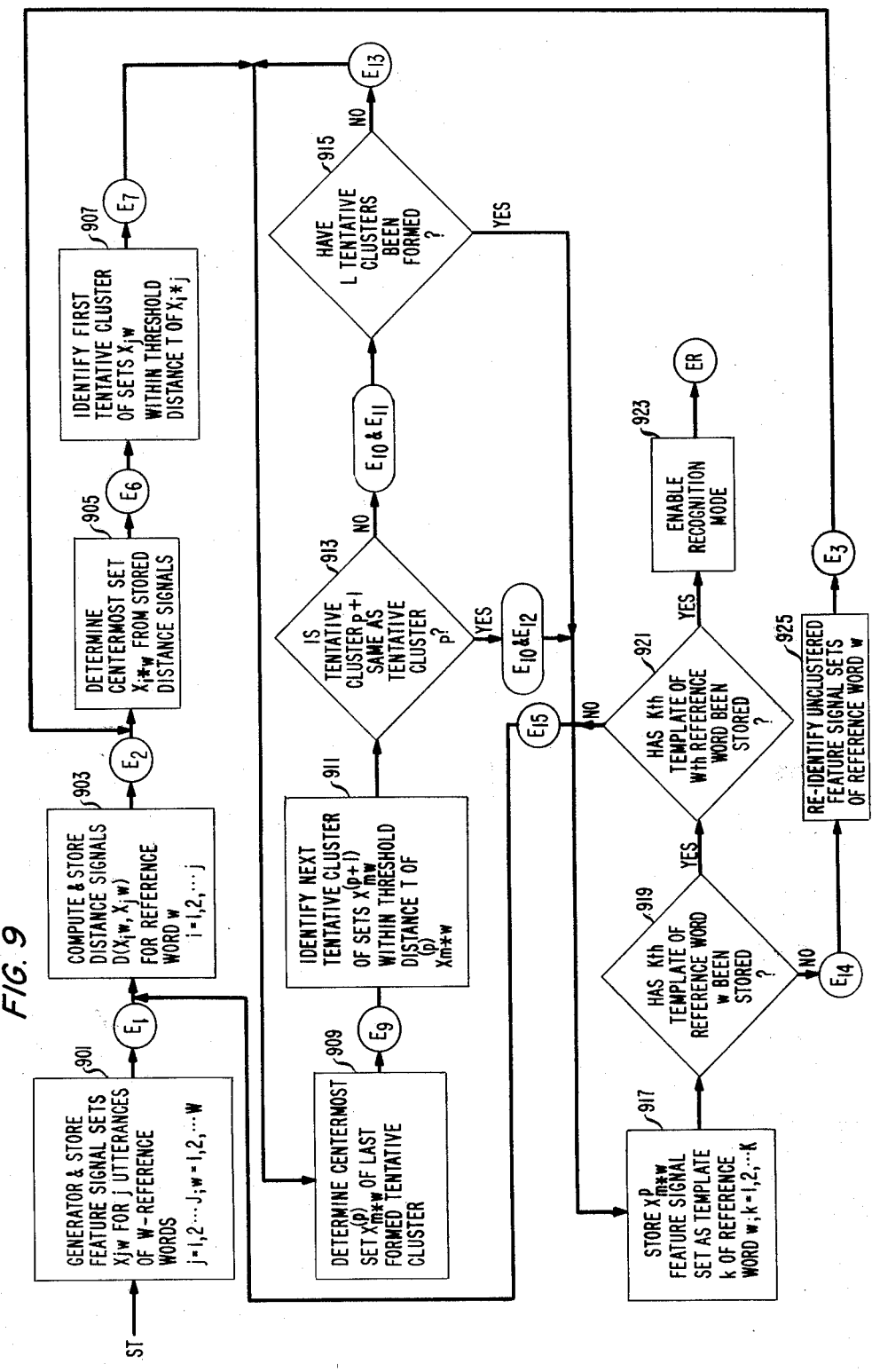
FIG. 9 shows a flow diagram of the training mode process performed in FIGS. 2 and 3.

The set of distance signals for the reference word are placed in a matrix store in clusterer 112. The computation and storage process shown in box 903 of FIG. 9 is performed responsive to feature signal prediction parameter signals from feature signal store 205 and the frame signals N. Responsive to the stored distance signals, the centermost $X_{i*w}$ of the reference word feature signal sets $X_{1w}, X_{2w}, \ldots, X_{Jw}$ is determined as indicated in operation box 905 of FIG. 9 by selecting the maximum distance signal for each column j of the matrix. The centermost set $X_{i*w}$ corresponds to the minimum of the maximum column distance signals. Thus i* is the index of the set $X_{i*w}$ such that $$\max_j D(X_{i*w},X_{jw}) \leq \min_i \max_j D(X_{iw},X_{jw}) \qquad (3)$$

where i is the index for the rows of the matrix store, and j is the index for the columns of the matrix store. A first tentative cluster of feature signal sets $X_{1w}^{(1)}, X_{2w}^{(1)}, \ldots, X_{mw}^{(1)}$, is then chosen by comparing the distance between each feature signal set $X_{jw}$ for j=1, 2, ..., J and the centermost set $X_{i*w}$ to a predetermined thershold distance T. All feature signal sets within the predetermined threshold distance T are identified as members of the first tentative group as shown in operation box 907 of FIG. 9. It is apparent, however, that the centermost set $X_{i*w}$ of the reference word feature signal sets may not be the centermost set $X_{m*w}^{(1)}$ of the first tentative group $X_{1w}^{(1)}, X_{1w}^{(1)}, \ldots, X_{mw}^{(1)}$. Centermost set $X_{m*w}$ of group $X_{1w}^{(1)}, X_{2w}^{(1)}, \ldots, X_{mw}^{(1)}$ is then determined from the index m* of the set $X_{m*w}$ such that $$\max_j D(X_{m*w},X_{jw}) \leq \min_m \max_j D(X_{mw},X_{jw}) \qquad (4)$$

This operation is indicated in operation box 909 of FIG. 9. Those feature signal sets of the tentative group $X_{1w}^{(1)}, X_{2w}^{(1)}, \ldots, X_{mw}^{(1)}$ which are within the predetermined threshold distance of centermost set $X_{m*w}$ are identified as members of a second tentative group $X_{1w}^{(2)}, X_{2w}^{(2)}, \ldots, X_{mw}^{(2)}$ as indicated in box 911 of FIG. 9. The successive grouping is continued as shown in boxes 909, 911, 913 and 915 until the members of group $X_{1w}^{(p)}, X_{2w}^{(p)}, \ldots, X_{mw}^{(p)}$ are the same as the members of the next group $X_{1w}^{(p+1)}, X_{2w}^{(p+1)}, \ldots, X_{mw}^{(p+1)}$ (decision box 913) at which time the members of group $X_{1w}^{(p)}, X_{2w}^{(p)}, \ldots, X_{mw}^{(p)}$ are permanently identified as a cluster; and the centermost feature signal set $X_{m*w}^{(p)}$ of this cluster is transferred from feature signal store 110 to template store 116 as the template signal set $T_{1w}$ representative of the just-determined cluster. This is shown in box 917 of FIG. 9. In the event that the grouping does not converge to a cluster of sets after L prescribed number of tentative groups are successively formed (decision box 915), the $L^{th}$ group is accepted as the final cluster, and its centermost member $X_{m*w}^{(L)}$ is stored as the template $T_{1w}$ representative thereof (box 917).

After the storage of the first template signal set $T_{1w}$ in store 116, the described clustering is repeated for the remaining ungrouped feature signal sets, i.e., those feature signal sets not identified to a previously formed cluster. Each time a cluster is formed, its centermost set is stored as a template $T_{kw}$, $k=1, 2, \ldots, K$ in store 116. In this manner, each template is a feature signal set representative of all feature signal sets in its cluster. Advantageously, each cluster includes all sets which have a prescribed degree of similarity as determined by the prediction parameter distance signals without requiring a fixed number of sets in a cluster or the averaging of distance signals.

After the templates $T_{kw}$ for all reference words $w=1, 2, \ldots, W$ have been selected and stored in template store 116 (decision box 921) the recognition mode is enabled (box 923). Mode selector 119 is then responsive to an externally generated RE signal to activate recognition controller 115. In the recognition mode, an unknown utterance U by any speaker is applied to the microphone of telephone handset 101. The speech signal from the handset microphone is supplied to speech signal digitizer 103 which, as aforementioned, is operative to provide digitally coded samples of the speech signal to feature generator 105 in successive frames. The prediction parameter signals produced for each frame in generator 105 are sequentially placed in feature signal register 120 under control of recognition controller 150. The formation of feature signal sets is indicated in operation box 2101 of FIG. 21 which is a flow chart illustrative of the recognition process.

Upon termination of the utterance U, distance processor 122 receives the succession of template signal sets $T_{kw}$ from store 116 and the unknown feature signals $T_u$ from register 120. Processor 122 is operative responsive to the $T_{kw}$ signals and $T_u$ signals to generate distance signals $D(T_{kw}, T_u)$ representative of the similarity between each template $T_{kw}$ and the unknown utterance feature signals $T_u$. Distance signal generation is indicated in operation box 2103 of FIG. 21.

Since the unknown utterance may include extraneous noise in its end portion, processor 122 provides a pair of distance signals for each feature signal comparision. One distance signal $D_T/N_T$ corresponds to the average frame distance between $T_{kw}$ and $T_u$ to the terminal frame $N_T$ of the utterance, and the other distance signal $D_I/N_I$ corresponds to the average frame distance between feature signal sets $T_{kw}$ and $T_u$ to a selected intermediate frame. The intermediate frame $N_I$ is selected such that the total energy in the unknown utterance speech signal from intermediate frame $N_I$ to the terminal frame $N_T$ is a predetermined portion of the total speech energy in the unknown utterance. In this way, any extraneous noise occurring after frame $N_I$ is removed. Both distance signals $D_T/N_T$ and $D_I/N_I$ are applied to minimum distance selector 125 in which the minimum of the two signals is selected for each template of the reference word. This minimum distance signal is the better choice for recognition purposes. The minimum distance signal selection is shown in operation box 2105 of FIG. 21.

The selected distance signal for each template of a reference word is supplied to sorter and store circuit 130 wherein each selected template distance signal is compared to the previously generated selected template distance signals for the reference word. Sorter and store circuit 130 is operative to store the q least valued distance signals. The remaining k−q distance signals are discarded. The sort and store operation is indicated in operation box 2107 of FIG. 21. The average of the q least valued distance signals from minimum distance selector 125 for each reference word is formed in selected distance signal averager 135 (operation box 2111), and the resultant averaged distance signal as well as the corresponding reference word code are placed in sorter and store 140 (operation box 2113). Sorter and store 140 is operative to sort the received averaged distance signals and to store a set of the minimum averaged distance signals along with their corresponding reference word codes.

After the averaged selected distance signals for all reference words are generated and the minimum set is stored in store 140, decision box 2115 transfers control to operation box 2117, and word selector 145 is operative to select the minimum averaged distance signal from sorter and store 140. The reference word code corresponding to the minimum averaged distance signal is then generated in selector 145 and transferred to processor 155 as indicated in operation box 2119. The recognition mode for the unknown utterance is then terminated. Alternatively, word selector 145 may be operative to select a predetermined set of the lowest valued averaged distance signals and to generate and transfer the reference word codes corresponding to these averaged distance signals to processor 155 for syntactic or semantic analysis as is well known in the art.

Figure 2:
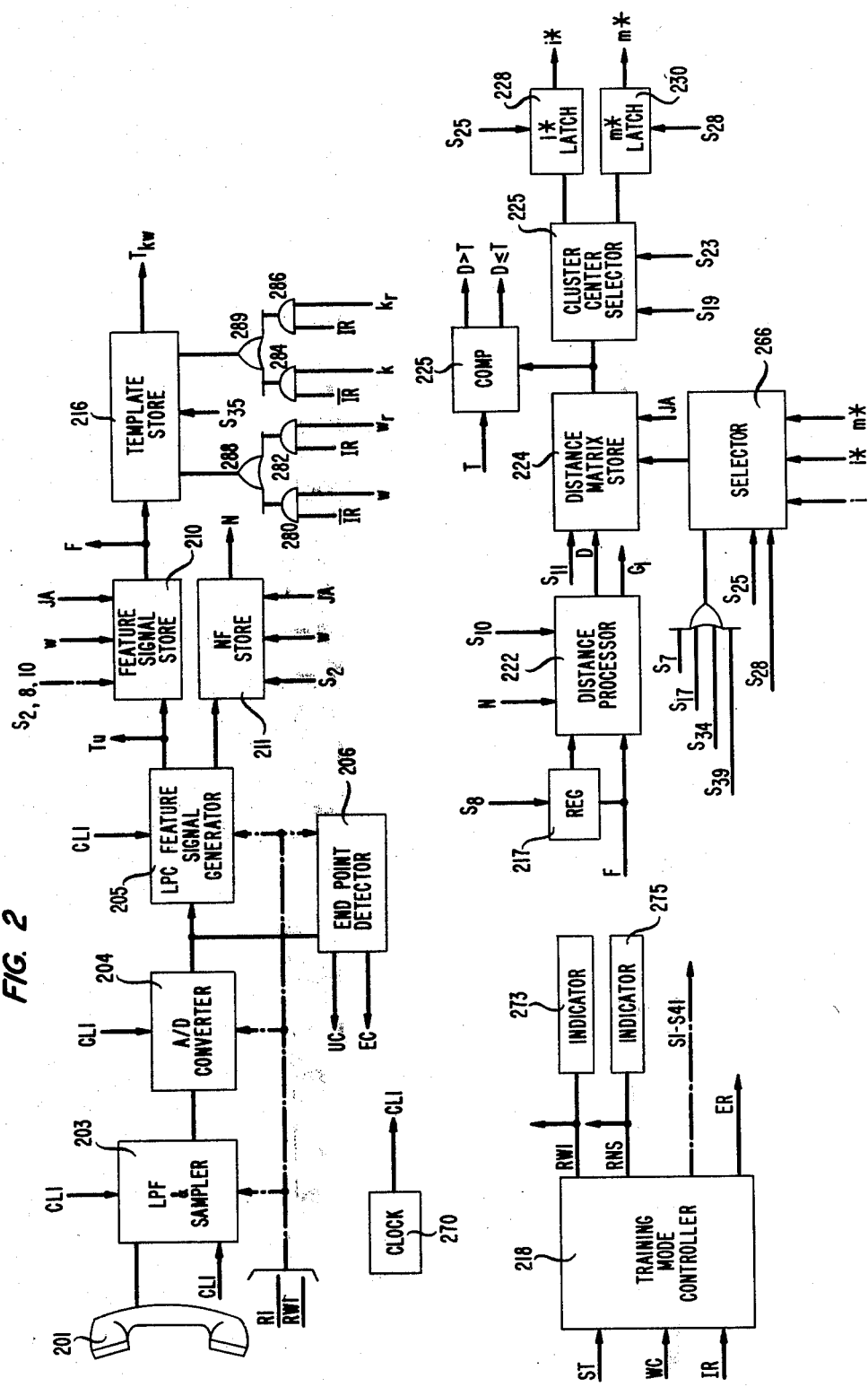
FIGS. 2 and 3 depict a detailed block diagram of the reference word template generation apparatus of FIG. 1.
Figure 3:
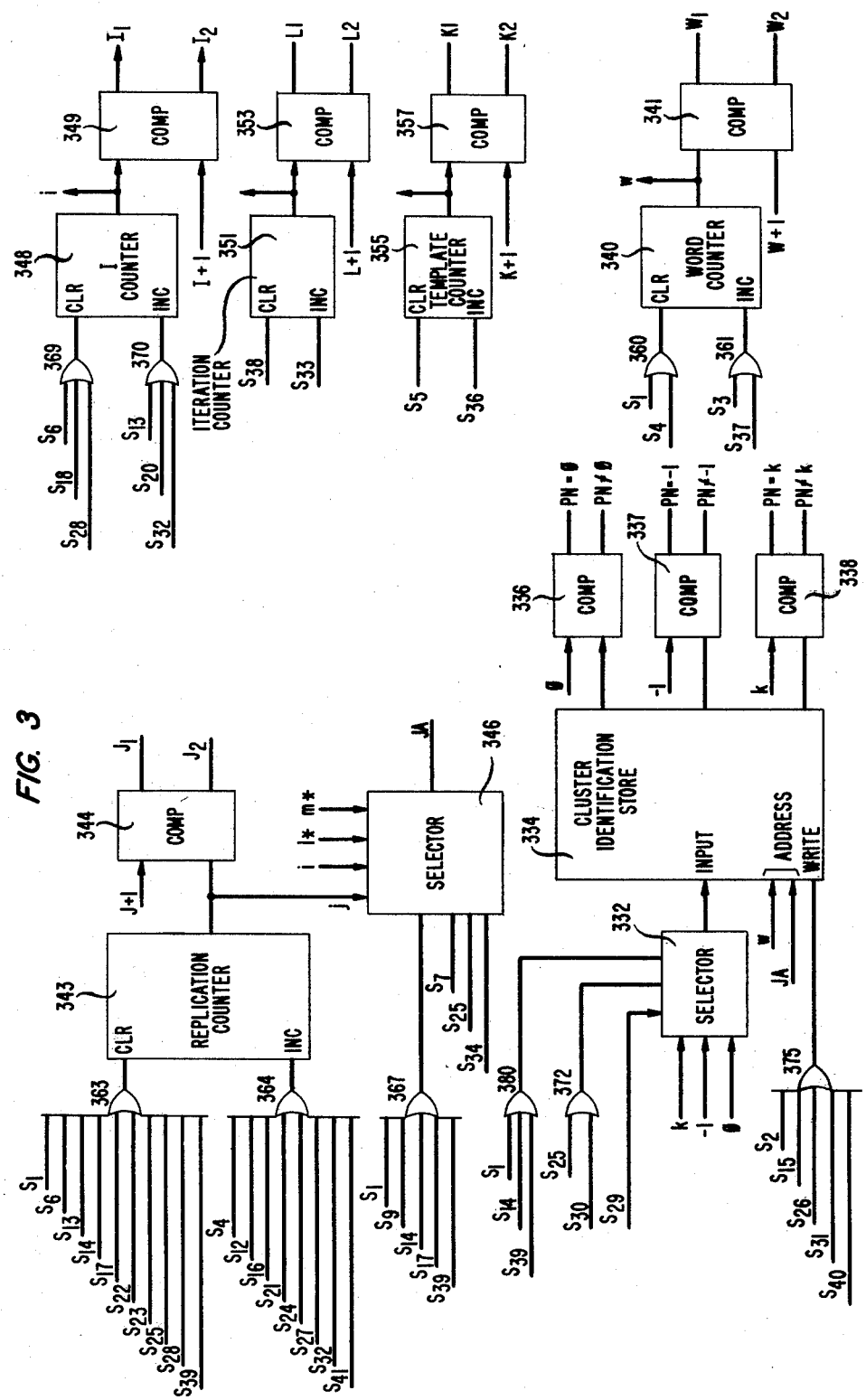
Figure 4:
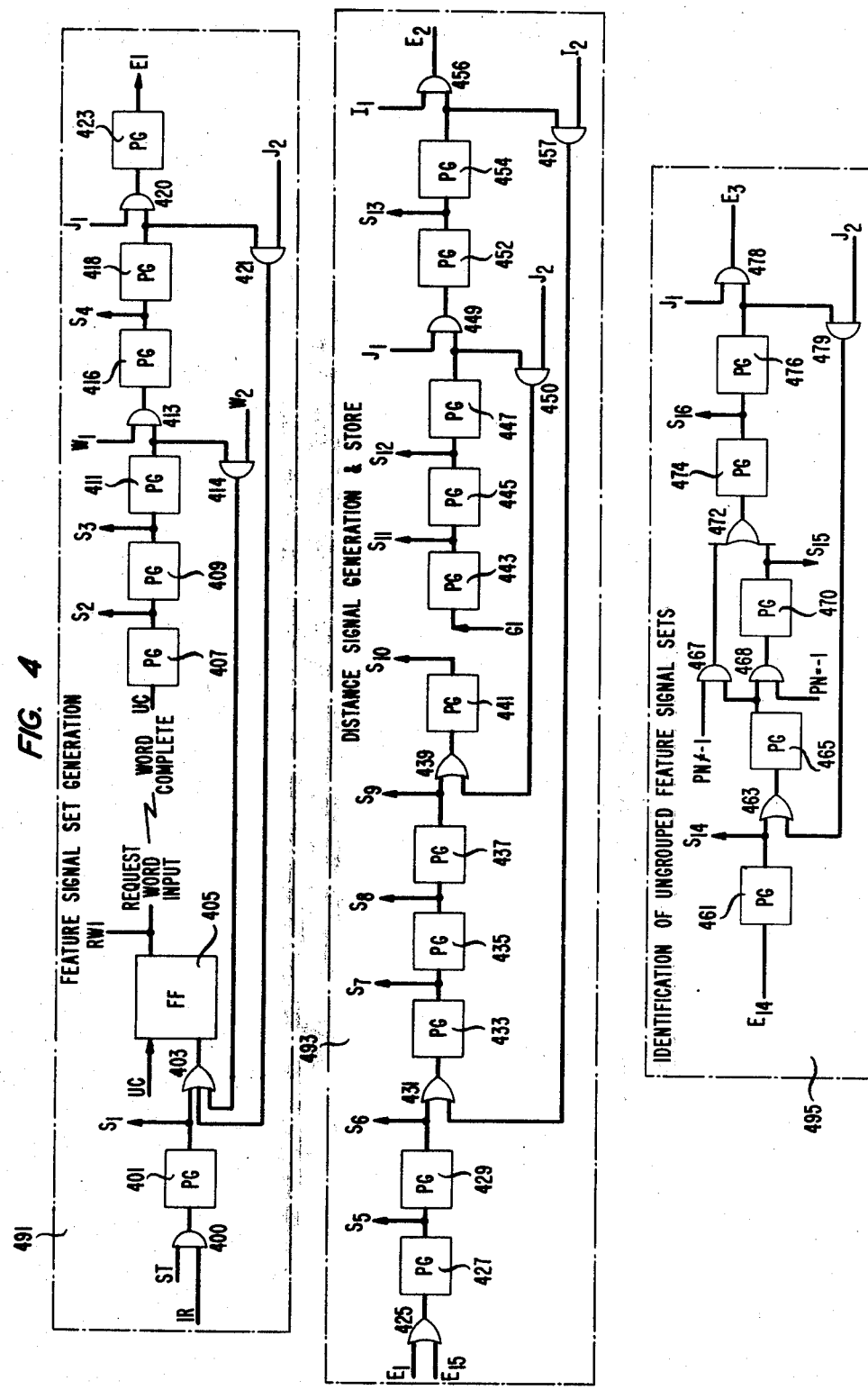
FIGS. 4, 5 and 6 show a detailed block diagram of the training mode controller of FIG. 2.

FIGS. 2 and 3 show a detailed block diagram of the training mode template generation apparatus described with respect to FIG. 1. The circuit of FIGS. 2 and 3 is first operative to accept identified utterances of all reference words from a sequence of speakers under control of logic circuit 491 of FIG. 4. When a speaker is at telephone handset 201, a manually generated ST pulse shown in waveform 1001 of FIG. 10 is applied to training mode controller 218. Pulse generator 401 in logic 491 of FIG. 4 is triggered by the trailing edge of the ST signal and produces a short duration positive $S_1$ control pulse shown in waveform 1003 of FIG. 10 at time $t_0$. The $S_1$ control pulse is applied to the clear input of word counter 340 via OR gate 360 and to the clear input of replication counter 343 via OR gate 363, whereby each one of these counters is reset to its first state. The $S_1$ pulse is also applied to the control input of selector 346 via OR gate 367 and to the control input of selector 332 via OR gate 380. Responsive to the $S_1$ pulse, selector 346 is switched to connect the j signal from the output of replication counter 343 to the JA address line at the output of the selector. Selector 346 remains in its j connection state until another control pulse is applied thereto. Selector 332 connects the zero code $\phi$ signal applied to its input to the input of cluster identification store 334 responsive to the $S_1$ control pulse. Selector 332 remains in its $\phi$ connection state until another control pulse is applied to it.

Word code w from word counter 340 and coded address signal JA (j) from selector 346 are applied to feature store 210 to address the storage of the linear prediction coefficient (LPC) feature signals from feature signal generator 205. At this time, the first speaker's utterance of the first reference word may be received at the microphone of telephone handset 201. Flip-flop 405 in logic 491 of FIG. 4 is set by the $S_1$ pulse applied thereto via OR gate 403, and the RWI output of flip-flop 405 becomes positive (waveform 1005 at time $t_1$). The positive RWI pulse enables lowpass filter and sampler 203, analog to digital converter 204, feature signal generator 205 and endpoint detector 206 in FIG. 2. The speaker at the microphone of handset 201 receives a visual or audio signal from indicator circuit 273, and responsive thereto, the speaker utters the first word (w=1). The speech signal from the microphone is applied to lowpass filter and sampler 203 wherein the frequency components above 3 kHz are removed. The lowpass filtered speech signal is sampled at a 6.67 kHz rate determined by clock signal CL1 from clock 270 and the successive speech signal samples are applied to A to D converter 204. In A to D converter 204, the samples are converted to appropriate digital codes, e.g., binary codes representative of the sample amplitudes.

The digital codes from A to D converter 204 are supplied to the input of feature signal generator 205 and to end point detector 206. The end point detector determines the termination point of the utterance from the energy content of the speech signal samples and may comprise the device described in U.S. Pat. No. 3,909,532 issued to L. R. Rabiner et al., Sept. 30, 1975. Upon termination of the utterance (time $t_2$ in FIG. 10), a high UC signal (waveform 1007) is obtained from the output of end point detector 206.

In LPC feature signal generator 205, the utterance samples $s_n$ are stored in blocks or frames of 300 coded signals $s_1$ through $s_{300}$. It is to be understood that other frame arrangements may be used. A linear prediction analysis of the sampled speech signal is made in accordance with $$s_n = \sum_{i=1}^{p} a(i)s_{n-i} \quad (5)$$

where n=1, 2, ...., 300 and p is the number of poles of the prediction analysis model. The linear prediction analysis is based on the all-pole linear prediction filter model well known in the art and described in "Speech Analysis and Synthesis by Linear Prediction of the Speech Wave," by B. S. Atal and S. L. Hanauer, *Journal of Acoustic Society of America*, Vol. 50, pp. 637–655, 1971. For purposes of speech recognition, it has been found that an 8-pole filter model is adequate. It is to be understood, however, that a filter model with a different number of poles may be used.

The linear prediction coefficients a(i), are the coefficients of the sampled speech signal $s_n$ in accordance with the representation of Equation (5). For the 8-pole filter model, the coefficients a(1) through a(8) are generated in LPC generator 205 in each frame of 300 samples by the autocorrelation method of linear prediction analysis in accordance with Equations (6) and (7).

$$y_k = \sum_{n=1}^{N-k} s_{n+k}s_n \quad k = 1, 2, ..., p \quad (6)$$

$$y_k = \sum_{i=1}^{p} a(i)y_{|i-k|} \quad k = 1, 2, ..., p \quad (7)$$

where N is the number of samples in each frame (N=300) and p=8. As is well known in the art, the linear prediction coefficients a(i) of Equation (5) are chosen to minimize the mean squared prediction error in accordance with Equations (6) and (7). As set forth in Equation (6), this is done by an autocorrelation analysis of the block of sample signals $s_n$ through $s_{n+N}$. The resulting linear prediction coefficients a(1) through a(8) are obtained for each frame of N speech samples.

Feature signal generator 205 may be the prediction parameter computer shown and described in U.S. Pat. No. 3,631,520 of B. S. Atal, issued Dec. 28, 1971, and assigned to the same assignee. This computer arrangement produces linear prediction parameters in accordance with the covariance method well known in the art. Alternatively, any computer, such as the PDP 11 or Nova 800, or, preferably, a microprocessor such as the Data General Micro Nova Computer, the Intel 8080 microprocessor or the Motorola 6800 microprocessor, on which the Fortran language program of Appendix A of "Formant Trajectory Estimation from a Linear Least Squared Inverse Filter Formulation," by John D. Markel, Speech Communications Research Laboratory, Inc., Monograph No. 7, Oct. 1971, can be implemented, may be used. This Fortran program is based on the autocorrelation method well known in the art. Each frame is 30 ms. in duration, and the coefficients a(1) through a(8) of the frame are temporarily stored in generator 205 at the end of the frame of the corresponding samples $s_n$ through $s_{n+300}$. Coefficient signals a(1) through a(8) for each frame derived from either the covariance or autocorrelation method may be used in the arrangement of FIGS. 2 and 3.

Figures 8, 19:
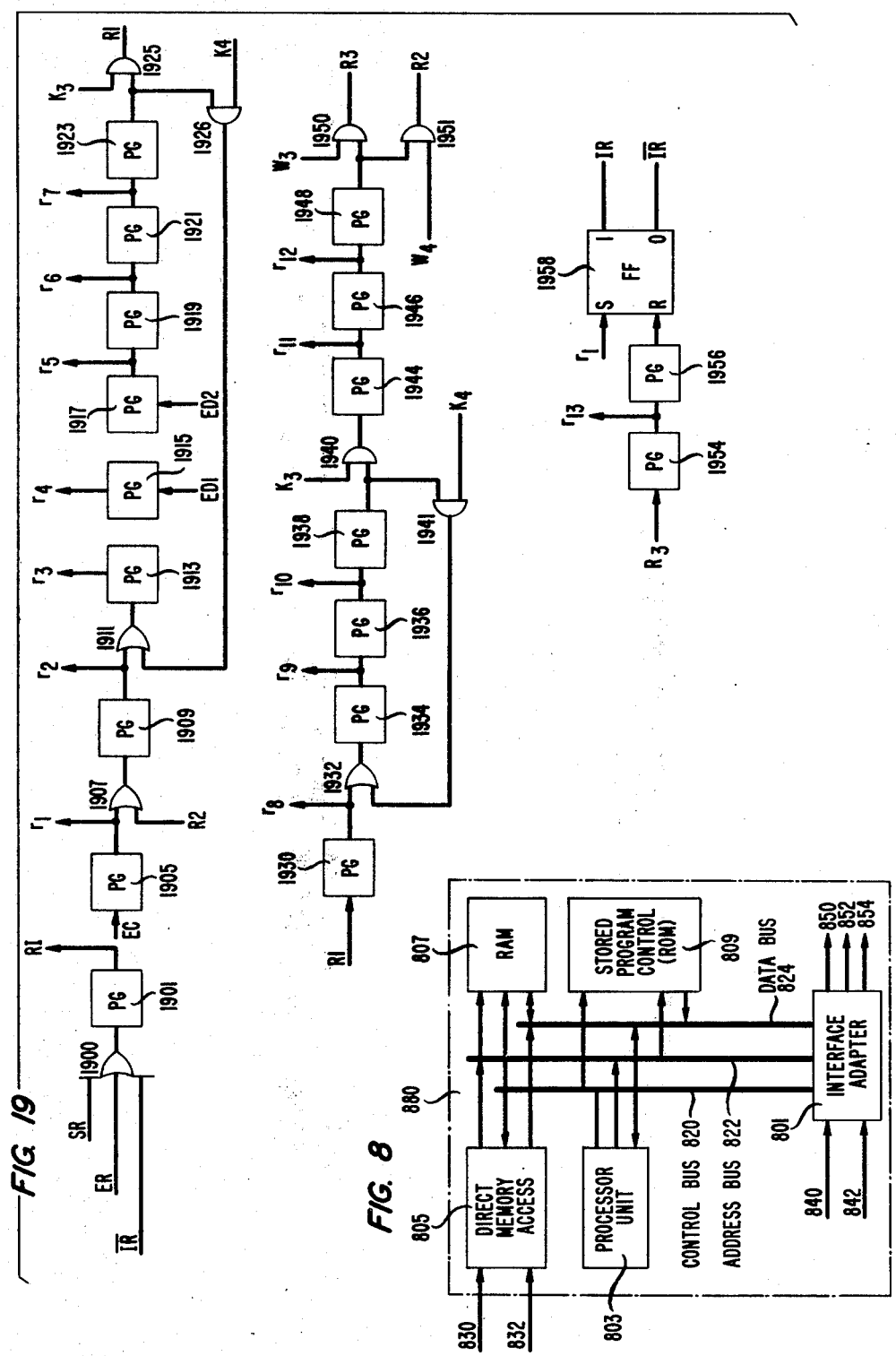
FIG. 8 shows a block diagram of a microprocessor useful in the speech analyzer illustrative of the invention.
FIG. 19 shows a detailed block diagram of the recognition controller of FIG. 18.

FIG. 8 shows a block diagram of a microprocessor well known in the art which may be used as LPC signal generator 205 of FIG. 2. In FIG. 8, control signals in microprocessor 880 are provided by stored program control 809 which comprises a read only memory (ROM) constructed to perform the Fortran program listing of Appendix A of the aforementioned Markel article by means of a microprocessor Fortran compiler well known in the art. Random access memory (RAM) 807 of microprocessor 880 receives data information from direct memory access 805 and interface adapter 801 via data bus 824 and also receives addressing information from direct memory access 805 and processor unit 803 via address bus 822. Computation is performed by processor unit 803 in accordance with the permanently stored program in stored program control 809. Control of microprocessor 880 is provided by processor unit 803 via control bus 820 which is connected to direct memory access 805, RAM 807, stored program control ROM 809 and interface adapter 801.

Interface adapter 801 receives input control information and data from input lines 840 and 842 for use by RAM 807 and processor unit 803; and also transmits output data and output control data from RAM 807 and processor unit 803 to output lines 850 and 852. The microprocessor and its component parts are described in "Technical Reference Micronova Computer Systems —014-000073-00," "User's Manual Programmer's Reference Micronova Computers 015-000050-00," and "Technical Reference Micronova Integrated Circuits 014-000074-00," all copyrighted 1975 by Data General Corporation or in "Microprocessor Applications Manual," by Motorola Semiconductor Products, Inc., published by McGraw Hill Book Company, copyrighted 1975 by Motorola, Inc.

In microprocessor 880 used as LPC generator 205, the sequential speech sample codes $s_n$ are applied from converter 204 to line 840 of FIG. 8, and are inserted into interface adapter 801. Signal RWI from flip-flop 405 is supplied to interface adapter 801 via line 842 so that LPC signals are produced by the microprocessor of FIG. 8 during the utterance. At the end of the utterance, signal UC from end point detector 206 resets flip-flop 405 to disable sampler circuit 203 and A to D converter 204. Signal UC is also applied to pulse generator 407 in logic 491 of FIG. 4, which generator produces an $S_2$ control pule shown in waveform 1009 at time $t_3$. Responsive to the $S_2$ control pulse at time $t_3$, the LPC feature signal set of the utterance, $X_{11}$, is transferred from generator 205 to the section of feature signal store 210 addressed by the w=1 signal from word counter 340 and the JA address signal j=1 originating in replication counter 343. The LPC signals generated by the microprocessor 880 in FIG. 8 are applied from interface adapter 801 to feature signal store 210 in FIG. 2 via line 850.

Feature signal generator 205 is also operative to count the number of speech signal frames in the utterance as the LPC feature signals are produced. At the end of the utterance, the signal $N_T$ corresponding to the total number of frames is transferred from generator 205 to NF store 211, wherein the total number of frames is stored as addressed by the word counter signal w supplied from counter 340 and the replication counter signal j supplied as the JA signal from selector 346. Cluster identification store 334 stores a PN code for each feature signal set that identifies the cluster to which the feature set is assigned. The PN code may be $\phi$, $-1$, or k. The $\phi$ code indicates the feature set is ungrouped. The k code corresponds to the cluster number of the feature set after assignment; and the $-1$ code is a temporary code used in the clustering arrangement. When each feature signal set is transferred to store 210, a $\phi$ code is inserted into cluster identification store 334 as addressed by the w and JA signals.

Pulse generator 409 generates an $S_3$ control pulse shown in waveform 1011 at time $t_4$ responsive to the trailing edge of the $S_2$ pulse. The $S_3$ control pulse is applied to the increment input of word counter 340 via OR gate 361. Word counter 340 is thereby incremented to its next state. The w=2 signal from counter 340 is applied to one input of comparator 341, wherein it is compared to constant signal W+1. W corresponds to the total number of reference words in the system. Comparator 341 produces a high $W_1$ signal (waveform 1015) when w is >W+1 and produces a high $W_2$ signal (waveform 1017) when w is ≦W+1. The $W_1$ signal is applied to gate 413 while the $W_2$ signal is applied to gate 414 in FIG. 4.

Pulse generator 411 provides a short duration positive output (waveform 1013) responsive to the trailing edge of $S_3$ control pulse at time $t_5$. The output of pulse generator 411 is applied to one input of AND gate 413 and to one input of AND gate 414. At time $t_5$, w is less than W+1, whereby gate 414 is enabled, and the pulse therefrom sets flip-flop 405 via OR gate 403. Flip-flop 405 is placed in its one state so that signal RWI (waveform 1005) becomes enabling at time $t_6$. Indicator 273 is turned on responsive to signal RWI, and the speaker receives a signal to utter the seocond word.

As described with respect to the speaker's utterance of the first word w=1, a set of LPC feature signals is produced in generator 205, which signals are stored in feature store 210. The total number of frames of the utterance of the second word is placed in NF store 211. In this manner, a feature signal set for the speaker's utterance of each reference word w=1, 2, . . . , W is obtained. When a high $W_1$ signal (waveform 1015) is obtained from comparator 341 at time $t_{11}$ in FIG. 10, the speaker has completed his utterance of all reference words and an output is obtained from gate 413. The output from gate 413 triggers pulse generator 416 which produces an $S_4$ (waveform 1019) control pulse at time $t_{12}$.

The $S_4$ control pulse is applied to the clear input of word counter 340 so that this counter is reset to its w=1 state. Pulse $S_4$ is also applied to the increment input of replication counter 343 via OR gate 364. Replication counter 343 maintains a count of the number of utterances of each reference word. Responsive to the $S_4$ pulse, indicator circuit 275 is operative to provide a signal that requests the next speaker.

Comparator 344, connected to the output of replication counter 343, is operative to compare the state of counter 343 (j) to the constant J+1 signal. J corresponds to the total number of replications of each reference word w required by the system. The $J_1$ output of comparator 344 is enabling when the i signal from counter 343 is >J+1, and the $J_2$ signal from comparator 344 is enabling when the i signal is ≦J+1. Pulse $S_4$ triggers pulse generator 418 which produces a short positive pulse (waveform 1021) that is applied to both gates 420 and 421 between times $t_{13}$ and $t_{14}$. In this time interval, signal $J_2$ (waveform 1025) is enabling, and AND gate 421 provides a pulse to retrigger flip-flop 405. A new RWI signal (wavefore 1005) is obtained from flip-flop 405 at time $t_{14}$ so that the new speaker is signaled to utter the w=1 reference word.

As previously described, the utterances of the new speaker are converted into feature signal sets in generator 205, which signal sets are stored in feature store 210. The number of frames for each utterance is stored in NF store 211, and the feature signal sets are identified as ungrouped sets by a $\phi$ code in cluster identification store 334. When the prescribed number of replications for each reference word have been obtained, the pulse from pulse generator 418 (waveform 1021 between times $t_{23}$ and $t_{24}$) passes through gate 420 responsive to the $J_1$ signal (waveform 1023) from comparator 344. Pulse generator 423 then generates an $E_1$ signal (waveform 1027) at time $t_{24}$, which signal indicates the input phase of the training mode (operation box 901 in FIG. 9) has been completed. At time $t_{24}$, J feature signal sets for each reference word have been stored in feature store 210 as addressed by word numbers w=1, 2, . . . , W and replication numbers j=1, 2, . . . , J.

Signal $E_1$ is used to initiate the distance processing phase of the training mode in which the distance signal shown in Equation (2) is generated in distance processor 222 for each pair of feature signal sets of a reference word. The resultant distance signal $D(X_{iw}, X_{jw})$ (i=1, 2, . . . , J, j=1, 2, . . . , J and w is the reference word) is inserted into distance matrix store 224 as addressed by the signal from counter 343. The j signal is supplied via selector 346, and a temporary index signal i is supplied by counter 348. The i index signals correspond to the rows of matrix 224, and the j index signals correspond to the columns of matrix 224. After the storage of the distance signals for the reference word w, the $X_{jw}$ signal sets for the reference word w are clustered, and distance processor 222 is enabled to generate the distance signals for the next reference word w+1.

Responsive to signal $E_1$, control pulses $S_5$ and $S_6$, shown in waveforms 1103 and 1105, respectively, are produced by the successive triggering of pulse generators 427 and 429 in control logic 493 in FIG. 4. Pulse $S_5$ causes template counter 355 in FIG. 3 to be reset to its $k=1$ state. Pulse $S_6$ is applied to temporary index counter 348 via OR gate 369 and to replication counter 343 via OR gate 363, whereby each of these counters is reset to its first state. The circuit of FIGS. 2 and 3 is thereby initialized for the distance processing phase indicated in operation box 903 of FIG. 9.

Control pulses $S_7$, $S_8$ and $S_9$ (waveforms 1107, 1109 and 1111) are then successively generated by pulse generators 433, 435 and 437, respectively, in logic 493 of FIG. 4. Responsive to the trailing edge of pulse $S_6$, pulse $S_7$ is generated. The $S_7$ pulse causes selector 346 to be put in its i state at time $t_3$, in which state the i signal from counter 348 is connected to the JA address otuput of the selector. The first feature signal set of the first word, $X_{11}$, in feature store 210 is then addressed. Pulse $S_7$ is also applied to selector 266 and is operative to connect the i input of selector 266 of its output. Control pulse $S_8$ is applied to feature store 210 and register 217 at time $t_4$, whereby feature signal set $X_{11}$ is transferred as signal F from the feature store to register 217. Selector 346 is then switched to its j state by pulse $S_9$ at time $t_5$ so that the output of replication counter 343 addresses the j columns of distance matrix store 224 via selector 346. The i signal from counter 348 addresses the i rows of matrix store 224 via selector 266.

The $S_9$ pulse from pulse generator 437 in logic 493 is applied to pulse generator 441 via OR gate 439. Responsive to the trailing edge of pulse $S_9$, pulse generator 441 produces control pulse $S_{10}$ (waveform 1113 at time $t_6$ in FIG. 11) which enables distance processor 222. Processor 222 may, for example, comprise microprocessor 880 of FIG. 8 having the distance processing program set forth in Appendix A herein permanently stored in stored program control 809. At this time, the feature signal set of the first utterance of the first reference word, $X_{11}$, in register 217 is transferred to direct memory access circuit 805 via lead 830. Responsive to pulse $S_{10}$, the first feature signal set, $X_{11}$, from feature store 210 is inserted into direct memory access circuit 805 via line 832. Microprocessor 880 then generates the distance signal $D(X_{11}, X_{11})$.

At time $t_7$, the end of the distance signal formation, ending signal $G_1$ (waveform 1115) appears on line 850 and is applied to the input of pulse generator 443 in FIG. 4. Responsive to signal $G_1$, pulse generators 443, 445 and 447 in logic 493 are successively triggered. Pulse generator 443 first produces an $S_{11}$ control pulse (waveform 1117), which pulse enables distance matrix store 224. Store 224 receives the distance signal D from line 852 of the microprocessor 880, and this distance signal is placed in the first column position of the first row as addressed by the control signal $i=1$ and the column signal $j=1$.

Control signal $S_{12}$ (waveform 1119) is supplied to the increment input of replication counter 343 via OR gate 364 at time $t_9$. Counter 343 is incremented to its $j=2$ state so that the next feature signal set $X_{21}$ in feature store 210 is addressed, and the second position of the first row of matrix store 224 is also addressed.

After the incrementing of counter 343, a pulse appears at the output of pulse generator 447 (wavefore 1121) at time $t_{10}$, which pulse is applied to AND gates 449 and 450 in logic 493. Gate 450 is enabled, since the $J_2$ output of comparator 344 (waveform 1125) is high, and pulse generators 441, 443 and 445 are successively triggered via OR gate 439. The $S_{10}$ pulse (wavefore 1113) from pulse generator 441 at time $t_{20}$ transfers the $X_{21}$ feature signal set to distance processor 222 which then proceeds to produce the $D(X_{11}, X_{21})$ signal. Responsive to the $G_1$ pulse occurring at time $t_{21}$, the end of the $D(X_{11},X_{21})$ distance signal formation, pulse $S_{11}$ is produced in pulse generator 443. The distance signal from processor 222 is then inserted into the second position of the first row of matrix store 224 responsive to pulse $S_{11}$.

Pulse $S_{12}$ again increments replication counter 343. Since the $J_2$ signal from comparator 344 is high at this time, the output of gate 450 retriggers pulse generators 441, 443 and 445. In this way, the distance signals $D(X_{11}, X_{11}), D(X_{11}, X_{21}), \ldots, D(X_{11}, X_{J1})$ of the first row of matrix store 224 are successively generated and stored therein. After replication counter 343 reaches its $J+1$ state, signal $J_1$ (waveform 1123) from comparator 344 becomes high, and signal $J_2$ becomes low. The pulse output of pulse generator 447 (waveform 1121) is then applied to pulse generator 452 via gate 449 at time $t_{31}$ so that the $S_{13}$ control pulse is produced. Pulse $S_{13}$ (waveform 1127) causes replication counter 343 to be reset to its $j=1$ state and increments i counter 348 to its $i=2$ state at time $t_{32}$. At this time, the $I_1$ signal from comparator 349 is low, while the $I_2$ signal from comparator 349 is high since the $i=2$ signal from counter 248 is less than $I+1$. Therefore, the pulse obtained from pulse generator 454 (waveform 1129) responsive to pulse $S_{13}$ at time $t_{40}$ passes through AND gate 457 and OR gate 431 to successively trigger pulse generators 433, 435 and 437 in logic 493.

Pulse $S_7$ from pulse generator 433 causes selector 346 to connect the i signal from counter 348 to the JA address input of feature store 210 whereby the $X_{21}$ feature signal set in store 210 is addressed. Upon the occurrence of pulse $S_8$, this feature signal set is transferred to register 217. Pulse $S_9$ from pulse generator 437 then connects the j output of replication counter 343 to feature store 210 and distance matrix store 224 via selector 346.

The trailing edge of control pulse $S_9$ triggers pulse generator 441 which generates an $S_{10}$ control pulse. This $S_{10}$ control pulse allows the transfer of the $X_{21}$ feature signal set from store 210 to processor 222 and enables processor 222 to generate the distance signal $D(X_{21}, X_{11})$. Responsive to ending signal $G_1$ from processor 222, pulse generator 443 applies an $S_{11}$ pulse to distance matrix store 224 which places distance signal $D(X_{21}, X_{11})$ in the $i=2, j=1$ position thereof. Pulse $S_{12}$ (waveform 1119) from pulse generator 445 increments replication counter 343 and triggers pulse generator 447 at time $t_{44}$.

The output of pulse generator 447 passes through gate 450 and retriggers pulse generators 441, 443, 445 and 447 in sequence so that distance signal $D(X_{21}, X_{21})$ is generated in processor 222 and stored in the $i=2, j=2$ position of distance matrix store 224. In this way, the second row distance signals $D(X_{21}, X_{11}), D(X_{21}, X_{21}), \ldots, D(X_{21},X_{J1})$ are successively produced and stored in matrix store 224 responsive to the successively repeated $S_{10}, G_1, S_{11}$, and $S_{12}$ signals. When replication counter 343 is incremented to its $J+1$ state by pulse $S_{12}$, the $J_1$ output of comparator 344 becomes high. The pulse from pulse generator 447 passes through AND gate 449 and pulse $S_{13}$ is produced. I index counter 348 is incremented to its $i=3$ state, and replication counter 343 is reset to its $j=1$ state by pulse $S_{13}$ from pulse generator 452. Since $i<J+1$ the pulse from pulse generator 454 passes through AND gate 457 whereby pulses $S_7$, $S_8$ and $S_9$ are again produced. These successive pulses cause the $X_{31}$ signal set from feature store 210 to be inserted into register 217, and trigger pulse generator 441 to generate an $S_{10}$ pulse. The $S_{10}$, $G_1$, $S_{11}$ and $S_{12}$ sequence is then repeated until distance signals $D(X_{31}, X_{11})$, $D(X_{31}, X_{21})$, ..., $D(X_{31}, X_{J1})$ are stored in the third row of matrix store 224.

When counter 343 is incremented to its $J+1$ state and counter 348 is in its $I=J$ state after the $D(X_{J1}, X_{J1})$ distance signal is stored in matrix store 224, the pulse from pulse generator 447 passes through AND gate 449. Responsive to the next $S_{13}$ pulse from pulse generator 452, counter 348 is placed in its $J+1$ state, and the $I_1$ output of comparator 349 (waveform 1131) in FIG. 11 goes high at time $t_{62}$. The pulse from generator 454 causes AND gate 456 to be enabled and an $E_2$ pulse (waveform 1135) is generated. The $E_2$ pulse occurs at time $t_{62}$ (FIG. 11) upon completion of the distance signal processing.

Figure 5:
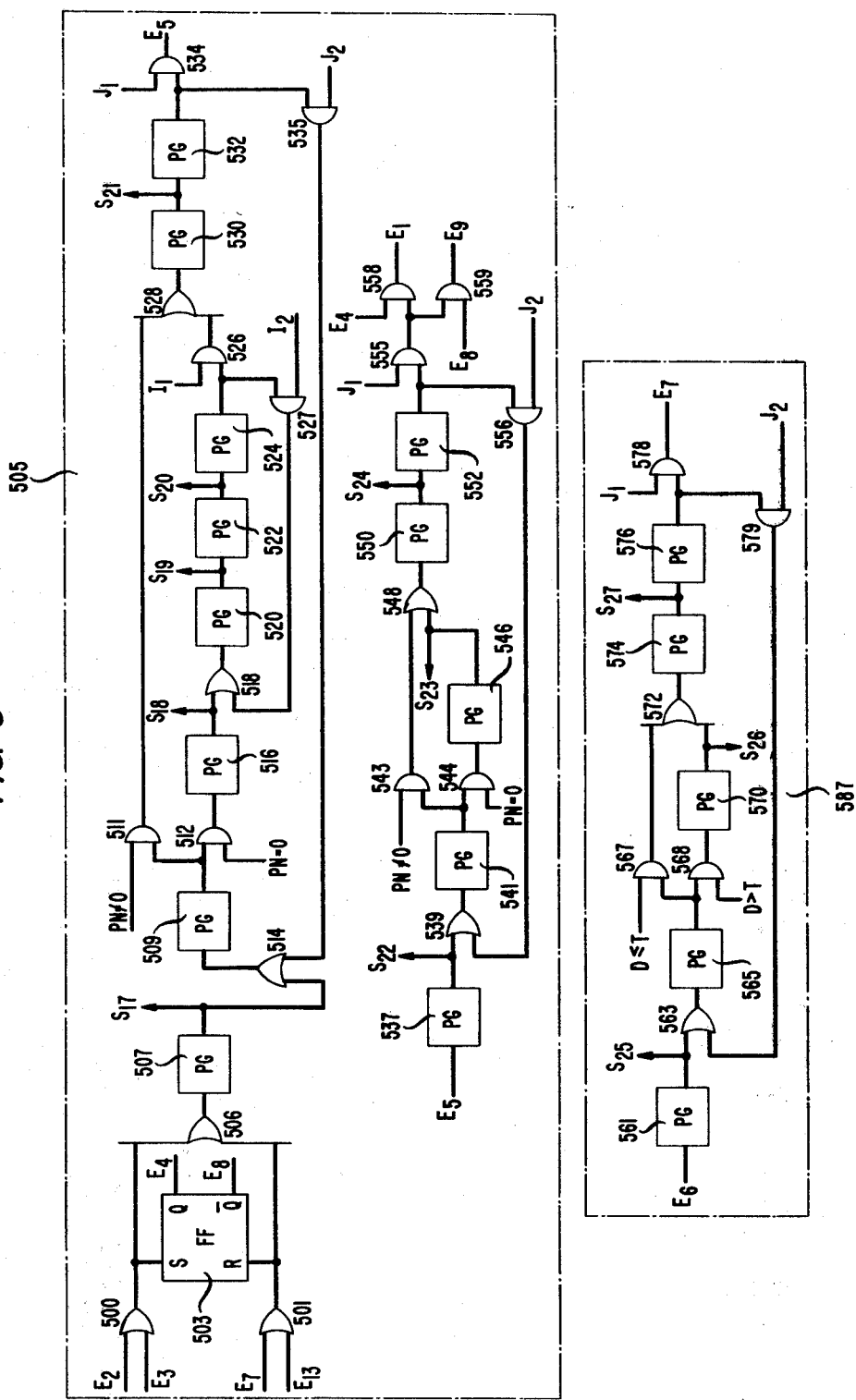
Figure 13:
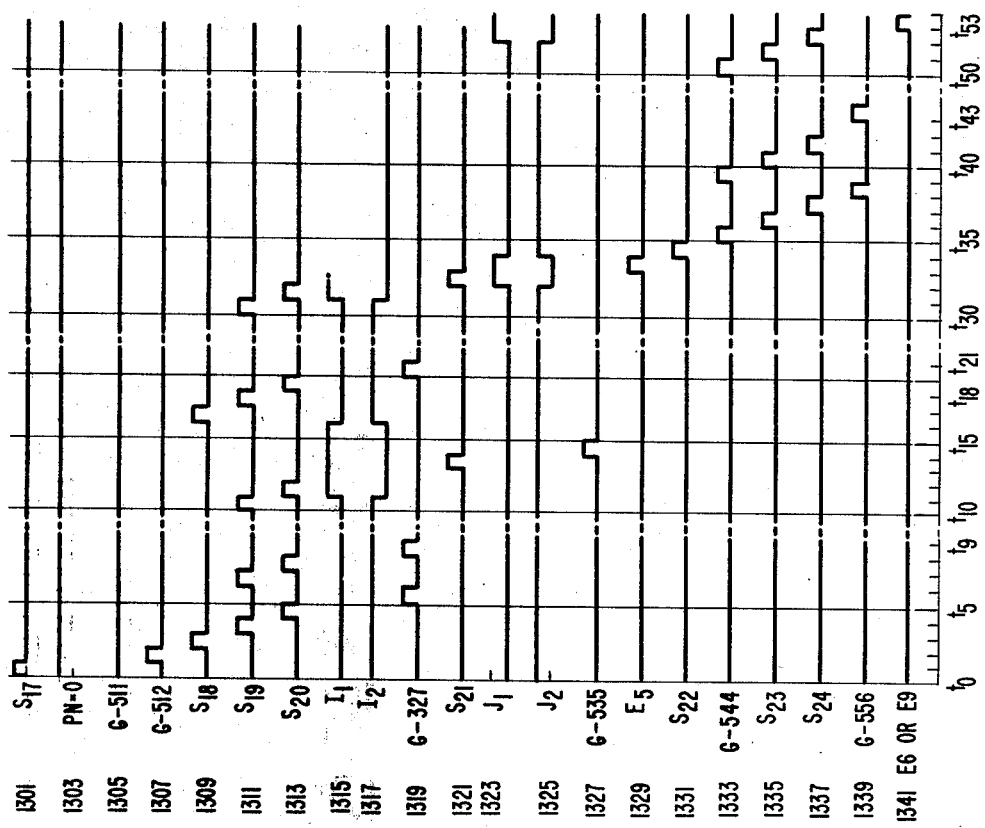

After the distance signals for reference word $w=1$, $D(X_{11}, X_{11})$ through $D(X_{J1}, X_{J1})$, are stored in matrix store 224, the clustering of the $w=1$ reference word feature signals $X_{11}, X_{21}, \ldots, X_{J1}$ is initiated. In the clustering phase of the training mode, the circuit of FIGS. 2 and 3 is first operative to determine the centermost $x_{i*1}$ of the first word feature signal sets $X_{11}, X_{21}, \ldots, X_{J1}$ in accordance with Equation (3). Responsive to pulse $E_2$, flip-flop 503 in logic 505 of FIG. 5 is set, and an $S_{17}$ control pulse shown in waveform 1301 of FIG. 13 is generated by pulse generator 507. Pulse $S_{17}$ clears replication counter 343 to its $j=1$ state and places selector 346 in its j state whereby the output of counter 343 is connected to address line JA. At this time, the PN identification code from cluster identification store 234 for the $j=1$, $w=1$ feature signal set is applied to comparators 336, 337 and 338.

Figure 7:
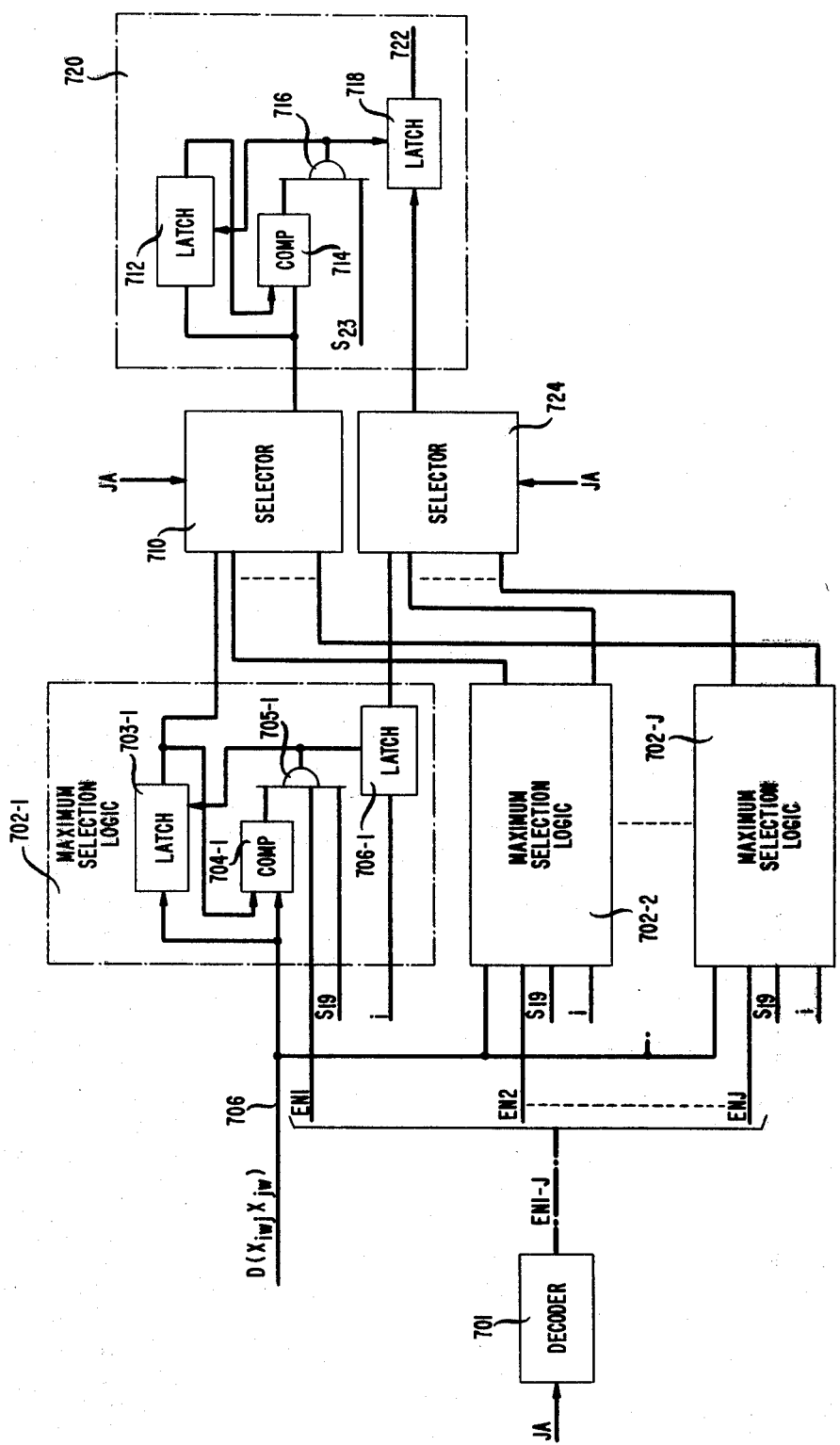
FIG. 7 shows a detailed block diagram of the cluster center selector of FIG. 2.

Comparator 336 compares the PN code from store 334 to the $\phi$ code. Comparator 337 compares the PN code to $-1$, and comparator 338 compares the PN code to k. Since all PN identification codes were previously set to $\phi$, the PN$=\phi$ output of comparator 336 (waveform 1303) is high and remains high until the output of counter 343 reaches its J state. This occurs because all feature signal sets $X_{11}, X_{21}, \ldots, X_{J1}$ are ungrouped at this time. Since the PN$=\phi$ signal from comparator 336 is high, AND gate 512 in logic 505 of FIG. 5 is enabled. Pulse generators 516, 520 and 522 are successively triggered so that cluster center selector 226 shown in detail in FIG. 7 is rendered operative to determine the maximum distance signal in each column j of matrix store 224. Pulse $S_{18}$ (waveform 1309) from pulse generator 516 in logic 505 clears I index counter 348 to its $i=1$ state at time $t_1$. Counter 343 is in its $j=1$ state, whereby decoder 701 in FIG. 7 generates a high EN1 signal. Pulse $S_{19}$ (waveform 1311) from pulse generator 520 is then applied to maximum selection logic circuits 702-1 through 702-J shown in FIG. 7 at time $t_3$. Since only signal EN1 from decoder 701 is high at this time, maximum selection logic circuit 702-1 is operative. Responsive to the $i=1$, JA$=1$ signals and control pulse $S_{19}$, the distance signal in the first row and first column of matrix 224 is applied via line 706 to the input of latch 703-1 and to one input of comparator 704-1. Latch 703-1 was previously cleared to its xero state. The row index signal i from counter 348 is applied to latch 706-1.

The output of comparator 704-1, which compares the distance signals applied thereto, becomes high if the distance signal from matrix store 224 on line 706 is greater than the signal stored in latch 703-1. Gate 705-1 is enabled when the output of comparator 704-1 is high. Thus, latch 703-1 stores the larger distance signal applied to comparator 704-1 during the $S_{19}$ pulse. The row index signal i of the larger distance signal is inserted into latch 706-1. Pulse $S_{20}$ (waveform 1313) from pulse generator 522 increments counter 348 at time $t_4$ so that the distance signal in the next row of $j=1$ column of matrix store 224 is addressed. Until the output of counter 348 which counts rows $i=1, 2, \ldots, J$ reaches its $J+1$ state, a high signal $I_2$ (waveform 1317) is obtained from comparator 349 and the pulse sequence $S_{19}$ and $S_{20}$ is repeated responsive to the operation of AND gate 527. In this manner, the maximum of the distance signals in column $j=1$ of store 224 is retained in latch 703-1 and the corresponding row index number is stored in latch 706-1.

When counter 348 reaches its $i=J$ state the last distance signal of the $j=1$ column is compared to the previously determined maximum distance signal in latch 703-1. The maximum of the $j=1$ column signals is then in latch 703-1 and the corresponding row index number is in latch 706-1. Counter 348 is then incremented to its $i=J+1$ state whereby the pulse from generator 524 and the high $I_1$ signal from comparator 349 enable AND gate 526. Pulse $S_{21}$ (waveform 1321) from pulse generator 530 then increments counter 343 to its $j=2$ state at time $t_{13}$ whereby signal EN2 from decoder 701 becomes high and the $j=2$ column of matrix store 224 is addressed. Responsive to the $J_2$ signal from comparator 344, gate 535 (waveform 1327) is enabled at time $t_{14}$ and the pulse from pulse generator 532 successively triggers pulse generators 516, 520, 522 and 524 in logic 505. Responsive to pulse $S_{18}$, $S_{19}$ and $S_{20}$, the maximum distance signal of the second column is determined by maximum selection logic 702-2 and the corresponding row index number i is stored as previously described with respect to logic circuit 702-1. After counter 348 is incremented to its $i=J+1$ state, the maximum distance signal of the $j=2$ column is stored in logic 702-2. The row index number i corresponding thereto is also stored in logic 702-2.

Counter 343 is then incremented to its $j=3$ state and the maximum distance signal of the $j=3$ column is determined and stored together with the corresponding row index number in maximum selection logic 702-2 not shown in FIG. 7. After counter 343 is incremented to its $J+1$ state responsive to an $S_{21}$ pulse from pulse generator 530 at time $t_{32}$, the maximum distance signal of each column of matrix store 224 and the corresponding row index numbers are stored in maximum selection logic circuits 702-1 through 702-J. The $J_1$ (waveform 1323) output of comparator 344 becomes high; AND gate 534 is enabled; and an $E_5$ pulse (waveform 1329) is produced in logic 505 at time $t_{33}$.

In accordance with equation (3), the row index of the minimum of the distance signals stored in maximum selection logic circuits 702-1 through 702-J is the index of the centermost feature signal set $X_{i*1}$. This minimum is selected in minimum selection logic 720 of FIG. 7. Control pulse $S_{22}$ (waveform 1331) is produced by pulse generator 537 at time $t_{34}$ responsive to the $E_5$ signal in logic 505. This $S_{22}$ pulse clears replication counter 343 to its $j=1$ state and triggers pulse generator 541 via OR gate 539 to generate a pulse which is supplied to AND gates 543 and 544. Since the PN$=\phi$ signal from comparator 336 is high, the pulse from generator 541 triggers pulse generator 546 via AND gate 544 and an $S_{23}$ control pulse (waveform 1335) signal is produced at time $t_{36}$. The $S_{23}$ control pulse is applied to one input of AND gate 716 in FIG. 7.

Selector 710 in FIG. 7 first selects the maximum distance signal stored in maximum selection logic 702-1 since counter 343 is in its j=1 state. Latch 712 was previously reset to its highest value state and comparator 714 produces a high output signal. Gate 716 is enabled whereby the j=1 column maximum distance signal is inserted into latch 712. At the same time, latch 718 in mimimum selector logic 720 is enabled by the pulse from gate 716 so that the row index i previously stored in latch 706-1 is transferred to latch 718 via selector 724.

Upon termination of control pulse $S_{23}$ at time $t_{37}$, control pulse $S_{24}$ (waveform 1337) is generated by pulse generator 550. Pulse $S_{24}$ increments counter 343 to its next state and triggers pulse generator 552. The high $J_2$ output from comparator 344 and the pulse from pulse generator 552 in logic 505 enables AND gate 556 (waveform 1339) at time $t_{38}$. Pulse generators 541, 546, 550 and 552 are then retriggered in sequence so that the distance signal in maximum selection logic 702-2 is compared to the distance signal in latch 712 in comparator 714. The smaller of the two distance signals is stored in latch 712 and the row index of the smaller distance signal is stored in latch 718 as previously described.

The minimum selection sequence continues until the distance signal stored in logic 702-J is compared to the previously obtained minimum distance signal in latch 712. After the minimum of the maximum column distance signals in latches 702-1 through 702-J is stored in latch 712 and its corresponding row index number i* is stored in latch 718, counter 343 is incremented to its J+1 state by the $S_{24}$ control pulse at time $t_{52}$. The $J_1$ output of comparator 344 is now high, and the pulse from pulse generator 552 passes through AND gate 555. Responsive to the pulse output of AND gate 555 and the $E_4$ signal from flip-flop 503, AND gate 558 is enabled and a high $E_6$ output (waveform 1341) is obtained therefrom. The $E_6$ signal indicates that the centermost set $X_{i*1}$ of the first reference word feature signal sets $X_{11}, X_{21}, \ldots, X_{J1}$ has been determined.

The circuit of FIGS. 2 and 3 then becomes operative to identify a first group of feature signal sets responsive to the distance signals in distance matrix store 224, which feature signal sets are within a predetermined threshold distance T of the centermost feature signal set $X_{i*1}$. All feature signal sets having distance signals $D(X_{i*1}, X_{j1})$ T are identified by a −1 code in cluster identification store 334. The remaining feature signal sets whose distance signals $D(X_{i*1}, X_{j1}) \leq T$ retain the $\phi$ identification code. The feature signal sets of the first group $X_{11}^{(1)}, X_{21}^{(1)}, \ldots, X_{m1}^{(1)}$ are identified by $\phi$ codes in cluster identification store 334.

Signal $E_6$ from AND gate 558 in FIG. 5 triggers pulse generator 561 in logic 587 of FIG. 5 which, in turn, produces an $S_{25}$ control pulse. The $S_{25}$ control pulse, shown in waveform 1401 of FIG. 14, is applied to latch 228 in FIG. 2 so that the i* index code from latch 718 in cluster center selector 226 is transferred to latch 228. Pulse $S_{25}$ causes selector 266 to be switched to its i* state whereby the output of latch 228 is connected to the i* row address input of matrix store 224. Selector 332 is set to its −1 state by pulse $S_{25}$ applied to OR gate 372. In the −1 state, selector 232 connects a −1 code to the input of cluster identification store 334.

Replication counter 343 is cleared to its j=1 state by the $S_{25}$ pulse applied to OR gate 363. Upon termination of pulse $S_{25}$, the first column position (j=1) of row i* in distance matrix store 224 is addressed. The addressed distance signal $D(X_{i*1}, X_{11})$ is read out of matrix store 224 and is applied to one input of comparator 225. A predetermined threshold distance code T is supplied to the other input of comparator 225. If the addressed distance signal is greater than the threshold distance T, the D >T (waveform 1405 in FIG. 14) output of comparator 225 is high (e.g., between times $T_3$ and $T_7$) and AND gate 568 (waveform 1409) in logic 587 of FIG. 5 is enabled. The pulse from gate 568 triggers pulse generator 570 whereby an $S_{26}$ control pulse (waveform 1411) is produced at time $t_6$. The $S_{26}$ control pulse enables cluster identification store 334 in FIG. 3 to write in a −1 code from selector 332 so that the −1 code is stored in the location of cluster identification store 334 designated by the j signal from replication counter 343. In this way, the addressed feature signal set for which distance signal D is greater than T is identified as an outlier set outside the first group of feature signal sets.

When the addressed distance signal from cluster identification store 334 is equal to or less than the predetermined threshold distance T, the D≤T output (waveform 1403) of comparator 225 is high, e.g., between times $t_0$ and $T_4$ in FIG. 14. AND gate 567 in logic 587 of FIG. 5 is then enabled. The corresponding location of cluster identification store 334 remains unchanged because pulse $S_{26}$ is not generated. When the cluster identification code is $\phi$, the addressed feature signal set is in the first group.

Pulse generator 574 in logic 587 produces an $S_{27}$ control pulse (waveform 1413) which increments replication counter 343 and triggers pulse generator 576. The $J_2$ output (waveform 1417) of comparator 344 is high at this time and remains high until counter 343 reaches its J+1 state. Consequently, the pulse from pulse generator 576 enables AND gate 579 (waveform 1419) and the comparison of the next addressed distance signal with threshold distance T is performed. In this manner, the j=1, 2, ..., J column location distance signals in row i* are sequentially compared to threshold distance T whereby the first group is identified in cluster identification store 334.

After the last distance signal in row i*, $D(X_{i*1}, X_{J1})$, is compared to distance threshold T and the result is entered into cluster identification store 334, replication counter 343 is incremented to its J+1 state and the $J_1$ output (waveform 1415) of comparator 344 becomes high at time $t_{11}$. AND gate 578 in logic 587 is enabled by the high $J_1$ signal and the pulse from pulse generator 576. A high $E_7$ signal (waveform 1421) then appears at the output of AND gate 578 at time $t_{12}$. The $E_7$ signal indicates the termination of the first group formation.

The centermost feature signal set $X_{m*i}$ of the first group $X_{11}^{(1)}, X_{21}^{(1)}, \ldots, X_{m1}^{(1)}$, in general, is not the set $X_{i*1}$ so that the centermost set of the first tentative cluster must be separately determined. In accordance with the invention, this is done in cluster center selector 226 (shown in detail in FIG. 7) by finding the row index m* such that $$\max_j D(X_{m*1}^{(1)}, X_{j1}^{(1)}) \leq \min_m \max_j D(X_{m1}^{(1)}, X_{j1}^{(1)}). \qquad (8)$$

Signal $E_7$ resets flip-flop 503 in logic 505 of FIG. 5 and triggers pulse generator 507 which produces an $S_{17}$ control pulse. Pulse $S_{17}$ is operative to clear replication counter 343 to its j=1 state and to set selector 346 to its j state via OR gate 367. As previously described with respect to the determination of the centermost feature signal set $X_{i*1}$, the circuit of FIGS. 2 and 3, including cluster center selector 226, is operative responsive to control pulses $S_{18}$, $S_{19}$, $S_{20}$, and $S_{21}$ to select the minimum of the maximum column distance signals in matrix store 222 and to identify the m* row index number of said minimum distance signal. In determining the $X_{m*1}$ set, however, only the feature signal sets of the first group are considered. These first group feature signal sets $X_{11}^{(1)}, X_{21}^{(1)}, \ldots, X_{j1}^{(1)}, \ldots X_{m1}^{(1)}$ are identified by the cluster indentification code PN=$\phi$ stored in cluster identification store 334.

Where the PN output of store 334 is $\phi$, comparator 336 provides a high PN=$\phi$ output to gate 512 in logic 505 whereby cluster center selector 226 shown in FIG. 7 is enabled by control pulses $S_{18}$, $S_{19}$, and $S_{20}$. If, however, the PN=$\phi$ output of comparator 336 is high, indicating that the addressed feature signal set is not in the group, cluster center selector 326 is operative to ignore the corresponding distance signals in the maximum column distance signal selection since control pulses $S_{18}$, $S_{19}$, and $S_{20}$ are not generated. In like manner, only feature signal sets in the group are considered in the selection of the minimum of maximum column distance signals since AND gate 543 in logic 505 is operative to exclude feature signal sets for which PN identification codes are other than $\phi$. At the end of the operation of cluster center selector 226 for the first group, the m* index corresponding to the first group centermost set $X_{m*1}^{(1)}$ is stored in latch 718 in FIG. 7. Signal $E_9$ is also produced by gate 559 in FIG. 5 responsive to the pulse from AND gate 555 and the high $E_8$ signal from flip-flop 503.

Figure 15:
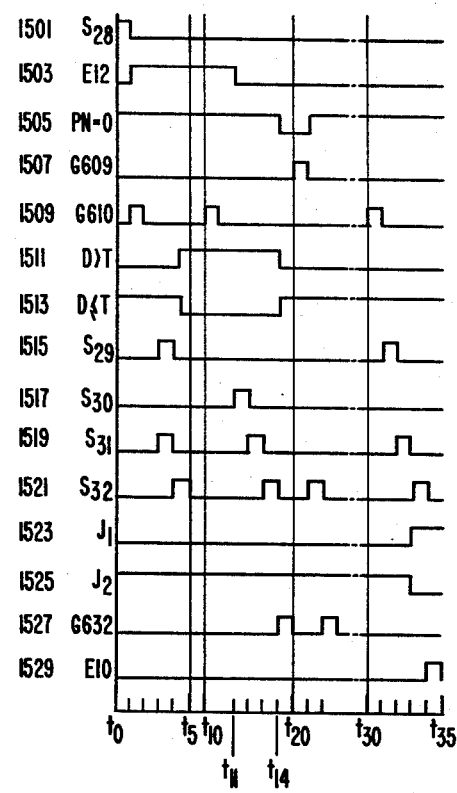

Subsequent to the selection of $X_{m*1}^{(1)}$, the circuit of FIGS. 2 and 3 is operative to select the feature signal sets which are within the threshold distance T of set $X_{m*1}^{(1)}$. Responsive to signal $E_9$ from AND gate 559, pulse generator 601 in logic 600 of FIG. 6 produces an $S_{28}$ control pulse shown in waveform 1501 of FIG. 15 which tranfers the m* row index from latch 718 (FIG. 7) to latch 230 in FIG. 2. Pulse $S_{28}$ is also operative to set selector 266 to its m* state, to clear replication counter 343, and to reset flip-flop 605 so that a high $E_{12}$ signal is obtained (waveform 1503).

At time $t_1$ upon the termination of pulse $S_{28}$, the j=1 column position of the m* row of matrix store 224 is addressed and the first feature signal set identification code location in cluster identification store 334 is addressed. Pulse generator 607 in logic 600 is triggered by the trailing edge of pulse $S_{28}$ and the output of pulse generator 607 is applied to AND gates 609 and 610. The PN$\neq\phi$ output of comparator 336 is applied to AND gate 609 while the PN=$\phi$ output (waveform 1505) of comparator 336 is applied to AND gate 610. If the addressed feature signal set is in the first group, the PN=$\phi$ signal is high (between times $t_0$ and $t_{10}$), AND gate 610 (waveform 1509) is enabled at time $t_1$ and a pulse is obtained from pulse generator 612.

The distance signal addressed in matrix store 224 is supplied to comparator 225, and is compared therein to the predetermined distance threshold signal T. Responsive to a high D$\leq$T signal (waveform 1513) from comparator 225 in FIG. 2, AND gate 615 is enabled and an $S_{29}$ pulse (waveform 1515) is generated by pulse generator 617 at time $t_2$. The S pulse switches selector 332 to its k state so that the k output of template counter 355 is connected to the input of cluster identification store 334 and a k coded template signal is inserted into the addressed location of store 334 by pulse $S_{31}$ (waveform 1519) from pulse generator 623 at time $t_3$. This arrangement identifies the corresponding feature signal set as a member of the second group $X_{11}^{(2)}, X_{21}^{(2)}, \ldots, X_{j1}^{(2)}, \ldots, X_{m1}^{(2)}$.

When the D>T output (waveform 1511) of comparator 225 is high (e.g., between times $t_5$ and $t_{14}$) responsive to the comparison of the addressed distance signal in matrix store 224 with the threshold distance signal T, AND gate 614 is enabled and an $S_{30}$ control pulse (waveform 1517) is produced by pulse generator 619 at time $t_{11}$. Responsive to pulse $S_{30}$, selector 332 is switched to its $-1$ state whereby a $-1$ signal is inserted into the addressed location of cluster identification store 334 by pulse $S_{31}$ from pulse generator 623. The $-1$ signal identifies the addressed feature signal set as an outlier set, i.e., not a member of the second group. In the event that the PN=$\phi$ output of comparator 336 is high for the addressed feature signal set, e.g., between times $t_{14}$ and $t_{21}$, AND gate 609 is enabled and neither an $S_{29}$ nor an $S_{30}$ pulse is produced. Control pulse $S_{32}$ is produced at time $t_{21}$ responsive to the operation of gate 609. In this manner, the identification of the feature signal set in cluster identification store 334 remains unchanged and the set is not a member of the second tentative cluster.

After the identification of each feature signal set of the first group as an outlier set or a member of the second group responsive to control pulse $S_{29}$ or $S_{30}$ and control pulse $S_{31}$, control pulse $S_{32}$ is generated by pulse generator 627 in logic 600. Pulse $S_{32}$ increments replication counter 343 and the identification process is continued for the next signal set addressed by incremented replication counter 343. When replication counter 343 is incremented to its J+1 state upon identification of the $J^{th}$ feature signal set, the $J_1$ output (waveform 1523) of comparator 224 becomes high at time $t_{33}$ and an $E_{10}$ signal (waveform 1529) is produced by gate 631 at time $t_{34}$. The identification of the second group $X_{11}^{(2)}, X_{21}^{(2)}, \ldots, X_{m1}^{(2)}$ is now completed.

If, during the feature set identification process, an outlier feature signal set is detected (D>T) by AND gate 614, the resulting $S_{30}$ pulse (waveform 1517 at time $t_{11}$) sets flip-flop 605 so that a high $E_{11}$ signal is obtained therefrom. In the event that all sets $X_{11}^{(1)}, X_{21}^{(1)}, \ldots, X_{m1}^{(1)}$ are within the threshold distance T of centermost set $X_{m*1}^{(1)}$, flip-flop 605 remains reset and an $E_{12}$ signal is obtained at the time the $E_{10}$ signal is produced by gate 631. The $E_{12}$ signal indicates that the second group is the same as the preceding first group. Where no outlier feature signal sets are detected, the just-identified group of feature signal sets is accepted as the first cluster and its centermost set $X_{m*1}^{(1)}$ is transferred from feature signal store 210 to template store 216 as the $T_{11}$ template.

Figure 6:
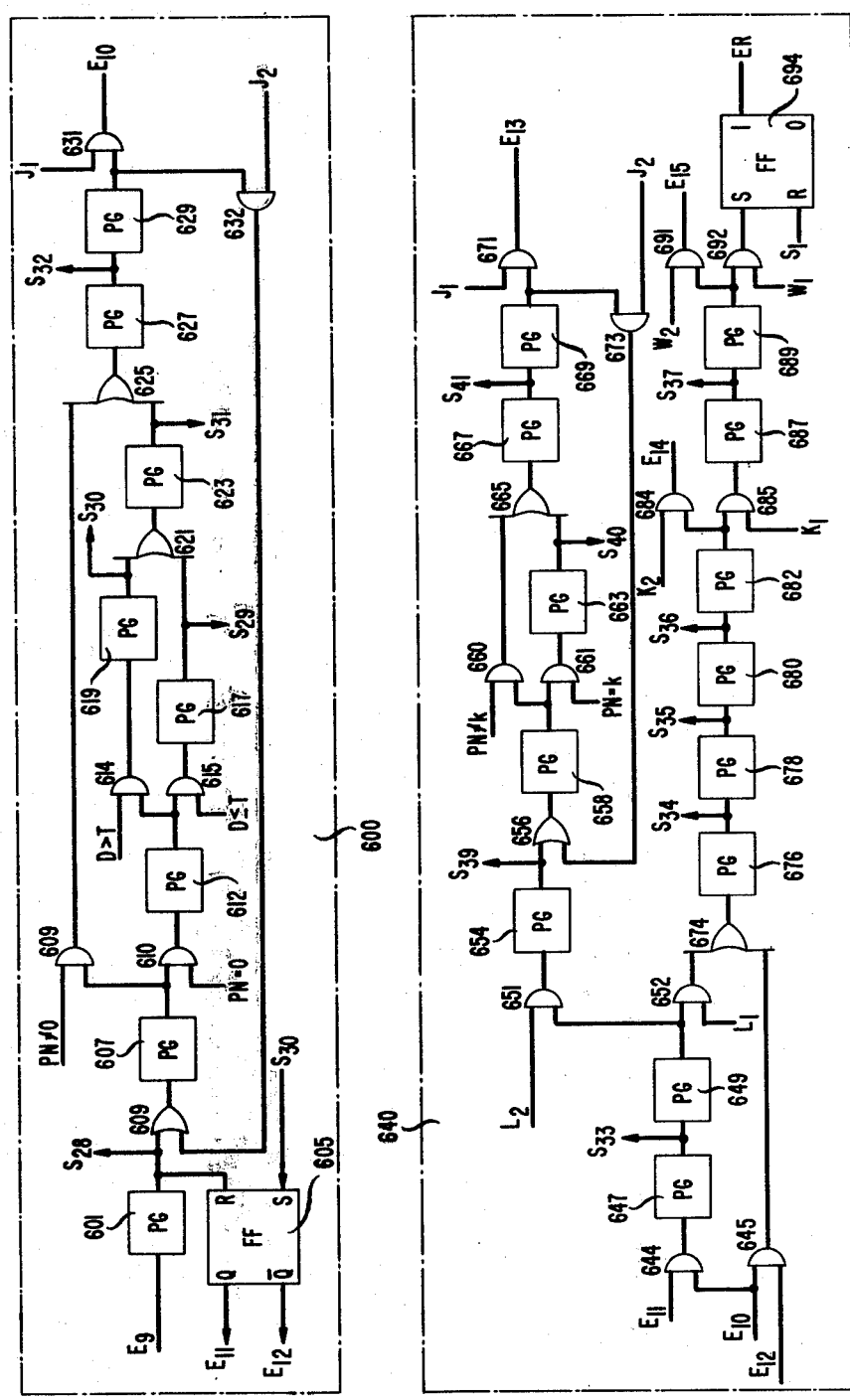

Assume, for purposes of illustration, at least one outlier set is detected by comparator 225 so that signal $E_{11}$ from flip-flop 605 is high at the time signal $E_{10}$ is produced. Responsive to the high $E_{10}$ and $E_{11}$ signals, AND gate 644 in logic 640 of FIG. 6 is enabled and control pulse $S_{33}$, shown in waveform 1601 of FIG. 16, is obtained from pulse generator 647. The $S_{33}$ pulse increments iteration counter 351 in FIG. 3, which counter records the number of group formations. Pulse generator 649 is then triggered by the trailing edge of the $S_{33}$ pulse. At this time, comparator 353 provides a high $L_2$ signal which indicates that the state or counter 351 is less than or equal to the L+1 code where L represents the maximum number of iterations allowed in the system.

Responsive to the $L_2$ output of comparator 353 and the pulse from generator 649, AND gate 651 in logic 640 is enabled (waveform 1603) and an $S_{39}$ pulse (waveform 1605) is produced by pulse generator 654 at time $t_2$. The $S_{39}$ pulse clears replication counter 343, switches selector 332 to its $\phi$ state and switches selector 346 to its j state. The circuit of FIGS. 2 and 3 is thereby initialized so that each cluster identification code PN=k is changed to PN=$\phi$ code prior to the formation of the next group. In this way, the identificaion of the ungrouped feature signal sets previously identified by a k code in cluster identification store 334 is changed. Pulse generator 658 is triggered by the $S_{39}$ control pulse. Where the first location of cluster identification store 334 contains a k code, comparator 338 provides a high PN=k signal and AND gate 661 (waveform 1609) is enabled at time $t_3$. An $S_{40}$ control pulse (waveform 1611) is then generated by pulse generator 663. The $S_{40}$ pulse is applied to the write input of store 334 via OR gate 375 so that a PN=$\phi$ signal is written into the addressed location of cluster identification store 334 from selector 332.

In the event that the PN code in the addressed location of cluster identification store 234 is not a k code, AND gate 660 (waveform 1607) is enabled at time $t_{11}$ by the PN$\neq$k signal from comparator 338 and the code in the addressed location of store 334 remains unchanged. An $S_{41}$ pulse (waveform 1613) is then generated by pulse generator 667, which pulse increments replication counter 343. Until replication counter 343 reaches its J+1 state, the $J_2$ output (waveform 1617) of comparator 344 remains high, gate 673 (waveform 1619 at times $t_6$ and $t_{13}$) is enabled by the pulses from pulse generator 669 and the cluster identification code change process is repeated for the next addressed feature signal set responsive to the operation of gates 660 and 661, and control pulse $S_{40}$. After the $J^{th}$ location of the cluster identification store is processed, replication counter 343 is incremented to its J+1 state. The $J_1$ output (waveform 1615) of comparator 344 becomes high by time $t_{23}$, and an $E_{13}$ pulse (waveform 1621) is obtained from AND gate 671 at time $t_{24}$.

The $E_{13}$ pulse occurs after all second group sets $(X_{11}{}^{(2)}, X_{21}{}^{(2)}, \ldots, X_{m1}{}^{(2)})$ have been reidentified as unclustered sets in cluster identification store 334 by PN=$\phi$ codes under control of logic 640. The centermost set $X_{m^*1}{}^{(2)}$ of the second group is then determined in cluster center selector 226 responsive to the distance signals for the sets having the PN=$\phi$ codes in store 334 under control of logic 505 in FIG. 5. Flip-flop 503 is reset by the $E_{13}$ pulse from AND gate 671 in logic 640 of FIG. 6, and an $S_{17}$ control pulse is generated by pulse generator 507. As described with respect to the determination of centermost feature signal sets $X_{i^*1}$, and $X_{m^*1}{}^{(1)}$, control pulses $S_{17}$, $S_{18}$, $S_{19}$, $S_{20}$ and $S_{21}$ from logic 505 in FIG. 5 are operative to cause cluster center selector logic 226 (FIG. 7) to successively determine the maximum distance matrix for each j column of distance matrix store 224 for the sets having a PN=$\phi$ code in cluster identification store 334 and to store the corresponding row index i.

After the maximum distance signal has been determined for the last column of store 224, an $E_5$ signal is produced by AND gate 534, which signal initiates the selection of the minimum of the maximum column distance signals by triggering pulse generator 537. Responsive to control pulses $S_{22}$, $S_{23}$ and $S_{24}$, minimum selection logic 720 is operative to store the minimum of the distance signals in maximum selection logic circuits 702-1 through 702-J in latch 712 and to store the row index m* corresponding thereto in latch 718. The selection is restricted to feature signal sets identified by PN=0 codes in cluster identification store 334 by AND gates 543 and 544 so that columns with no second group sets therein are excluded in the minimum determination. Upon completion of the $J^{th}$ column comparison, latch 718 in FIG. 7 contains the index m* of the second group centermost set $X_{m^*1}{}^{(2)}$ and signal $E_9$ is generated by AND gate 559 in logic 505 responsive to the high $E_8$ signal from flip-flop 503 and the pulse from AND gate 555.

Signal $E_9$ from AND gate 559 initiates the distance signal to threshold comparison in comparator 225 under control of logic 600. Responsive to signal $E_9$, control pulses $S_{28}$, $S_{29}$, $S_{31}$ and $S_{32}$ are produced in logic 600, which control pulses cause distance signals $D(X_{m^*1}{}^{(2)}, X_{11}{}^{(2)})$ through $D(X_{m^*1}{}^{(2)}, X_{m1}{}^{(2)})$ stored in distance matrix store 224 to be successively compared to the predetermined threshold distance T as previously described with respect to the first group. In this way, the third group sets are identified. The PN=$\phi$ code for each feature signal set in the second group for which the D$\leq$T output of comparator 225 is high, is changed to k as determined by template counter 355.

If all comparisons result in a high D$\leq$T output, the third group being identified is the same as the immediately preceding second group so that flip-flop 605 is in its reset state at the time ending signal $E_{10}$ is produced by AND gate 631. When there is at least one outlier feature signal set in the group being compared, for which a high D>T signal is obtained from comparator 225, flip-flop 605 is in its set state when signal $E_{10}$ is produced. Responsive to the high $E_{11}$ signal from flip-flop 605 and the $E_{10}$ pulse from AND gate 631, control pulses $S_{33}$, $S_{39}$, $S_{40}$ and $S_{41}$ from logic 640 in FIG. 6 are operative to reidentify each third tentative cluster feature signal set $(X_{11}{}^{(3)}, X_{21}{}^{(3)}, \ldots, X_{m1}{}^{(3)},)$ with a PN=$\phi$ code. The formation of successive groups is continued as previously described until no outlier sets are detected in the distance signal comparisons under control of logic 600 in FIG. 6.

Assume for purposes of illustration, signal $E_{12}$ from flip-flop 605 is high when AND gate 631 produces an $E_{10}$ signal. This occurs only if the just-formed group (e.g., p+1) is the same as the immediately preceding group (e.g., p). The cluster is then fixed and the centermost set $X_{m^*1}{}^{(p)}$ determined for the immediately preceding group is the template signal of the fixed cluster which is to be stored in template store 216.

Figure 17:
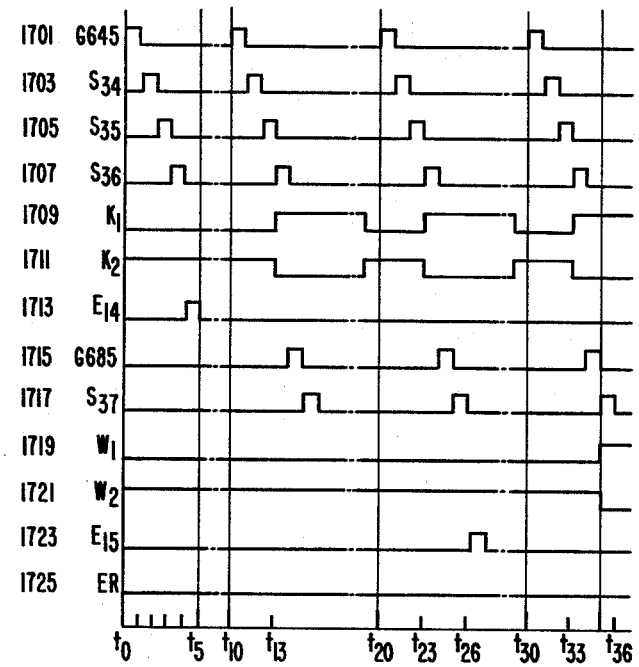

AND gate 645 in logic 640 of FIG. 6, shown in waveform 1701 of FIG. 17, is enabled by the high $E_{10}$ and high $E_{12}$ signals, and pulse generator 676 produces an $S_{34}$ control pulse (waveform 1703). Responsive to the $S_{34}$ pulse, selector 346 in FIG. 3 is switched to its m* state, and the m* row index code in latch 230 is applied to the JA address input of feature store 210. The $S_{34}$ pulse also triggers pulse generator 678 in logic 640 which produces an $S_{35}$ control pulse (waveform 1705). Template store 216, addressed by the w=1 output of word counter 340 via AND gate 280 and the k=1 output of template counter 355 via AND gate 284, then receives the $X_{m^*1}{}^{(p)}$ feature signal set from feature store 210 responsive to the $S_{35}$ pulse. In this way, the template $T_{11} = X_{m^*1}{}^{(p)}$ for the first cluster of the first reference word is inserted into template store 216. Control pulse $S_{36}$ (waveform 1707) is then produced by pulse generator 680 so that template counter 355 is incremented to its k=2 state.

Control pulse $S_{33}$ is produced by pulse generator 647 in logic 640 of FIG. 6 after each group formation in which an outlier feature signal set is detected. Iteration counter 351 is incremented by pulse $S_{33}$. After the $L^{th}$ group is formed, iteration counter 351 is put into its L+1 state by pulse $S_{33}$ and comparator 353 produces a high $L_1$ signal which enables AND gate 652. The output of AND gate 652 causes control pulses $S_{34}$, $S_{35}$, and $S_{36}$ to be generated in sequence so that the $L^{th}$ tentative cluster centermost set $X_{m*1}^{(L)}$ in feature store 210 is transferred to template store 216 as the $T_{11}$ template signal. In this way, tentative cluster formation is terminated at the end of L group identifications.

After the first template signal of the first reference word ($T_{11}$) is transferred to template store 216, no $\phi$ codes remains in cluster identification store 234. Each set is either identified as a member of the just-formed k=1 cluster in store 334 or is identified as an outlier set by the PN=−1 code in store 334. The outlier sets which are then used to form the k=2 cluster must be identified as ungrouped sets by the PN=$\phi$ code.

Figure 12:
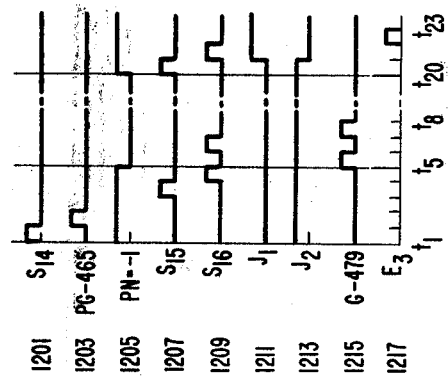

Responsive to the $S_{36}$ pulse from pulse generator 680, pulse generator 682 produces a high output. Gate 684 is enabled by the output of gate 684 and the high $K_2$ signal (waveform 1711) from comparator 357 in FIG. 3. Gate 684 produces an $E_{14}$ signal (waveform 1713) at time $t_4$, which signal is applied to pulse generator 461 in logic 495 of FIG. 4. Pulse generator 461 provides an $S_{14}$ control pulse shown in waveform 1201 of FIG. 12. The $S_{14}$ pulse clears replication counter 343 to its j=1 state, sets selector 332 to connect the PN=$\phi$ code to the input of cluster identification store 334, and sets selector 346 to connect the j output of replication counter 346 to the JA address line. Store 334 is then addressed by the j output of counter 343 and the w output of counter 340. Pulse generator 465 is triggered by the $S_{14}$ control pulse and the j=1 location of cluster identification store 334 is applied to comparator 337. The PN=−1 output of comparator 337 (waveform 1205) is high between times $t_0$ and $t_5$. Consequently, gate 468 is enabled and an $S_{15}$ control pulse (waveform 1207) is produced by pulse generator 470 at time $t_3$. The $S_{15}$ pulse is applied to the write input of cluster identification store 334 via OR gate 375 so that the PN=$\phi$ code from the output of selector 332 is inserted into the w=1, j=1 location of store 334.

Pulse generator 474 provides an $S_{16}$ control pulse (waveform 1209) responsive to either an $S_{15}$ pulse or the output of AND gate 467. The $S_{16}$ pulse increments replication counter 343 via OR garte 364. Counter 343 is then in its j=2 state so that comparator 344 provides a high $J_2$ signal (waveform 1213). Responsive to the high $J_2$ signal and the pulse from pulse generator 476, AND gate 479 (waveform 1215) is enabled and pulse generator 465 is retriggered. Between times $t_5$ and $t_{20}$ in FIG. 12, the PN=1 output from comparator 337 is low and the PN=$\phi$ output is high. Consequently, gate 467 is enabled and pulse generator 474 is triggered. An $S_{16}$ pulse is then produced at time $t_6$ but no $S_{15}$ pulse is generated. The code in the w=1, j=2 location of cluster identification store remains unaltered. Replication counter 343 is incremented by the $S_{16}$ pulse at time $t_6$ to its j=3 state and pulse generator 465 is retriggered. Logic 495 continues to control cluster identification store 334 by producing $S_{15}$ and $S_{16}$ pulses for the j=3, 4, ..., J feature signal sets. After pulse $S_{16}$ is produced for the $J^{th}$ feature signal set at time $t_{21}$, replication counter 343 is incremented to its j=J+1 state and comparator 344 provides a high $J_1$ output (waveform 1211). Gate 478 is enabled by the pulse from pulse generator 476 and the high $J_1$ output whereby an $E_3$ signal (waveform 1217) is produced at time $t_{22}$. The $E_3$ signal is applied to logic 505 in FIG. 5 which is operative to find the centermost set of the PN=$\phi$ code identified feature signal sets as previously described.

After the outlier sets have been reidentified by the PN=$\phi$ code in cluster identification store 334, the series of groups for the k=2 template are sequentially formed as described in detail with respect to the k=1 template. Referring to the flow chart shown in FIG. 9, the centermost set $X_{i*1}$ of the PN=$\phi$ identified feature signal sets is formed under control of logic 505 in FIG. 5 as indicated in box 905 in FIG. 9. Responsive to the $E_6$ signal from gate 558 in logic 505 after centermost set $X_{i*1}$ for the remaining ungrouped feature signal sets is determined, logic 587 controls the circuit of FIGS. 2 and 3 so that the sets of the first group are identified. These first group sets are the ungrouped sets within the threshold distance T of centermost set $X_{i*1}$. The identification of the first group is carried out in accordance with the operation in box 907 of FIG. 9. Signal $E_7$ from logic 587 is generated after the identification of the first group sets $X_{11}^{(1)}$, $X_{21}^{(1)}$, ..., $X_{m1}^{(1)}$ for k=2 is completed. The centermost set $X_{m*1}$ of the first group is then determined as shown in box 909 under control of logic 505.

Subsequently, the next tentative cluster is identified by the circuit of FIGS. 2 and 3 on the basis of threshold distance comparison as indicated in box 911 and the just-identified group is tested as indicated in decision box 913 to determine if it is the same as the immediately preceding identified group. These operations are performed by the circuit of FIGS. 2 and 3 under control of logic 600 as previously described. If the just-formed group is not the same as the immediately preceding group and is not the $L^{th}$ group (decision box 915), a new tentative cluster is formed as shown in operation boxes 909 and 911 of FIG. 9.

When the just-formed group is the same as the immediately preceding group or is the $L^{th}$ formed group, the operation in box 917 is performed, and the centermost set of the preceding group ($X_{m*1}^{(p)}$) is transferred from feature signal store 210 to template store 216 as the $T_{21}$ template. The template number k in template counter 355 is then examined to determine if all templates for the first reference word have been formed as shown in decision box 919. Until the $K^{th}$ template has been determined, signal $K_2$ (wavform 1711) from comparator 357 is high and the $E_{14}$ signal is obtained from AND gate 684 in logic 640. Logic 495 is then enabled to reidentify ungrouped feature signal sets as shown in operation box 925. Control signal $E_3$ from logic 495 is repeatedly produced to reinitiate the group formation operations in boxes 905, 907, 909, 911, 913, 915, 917, 919 and 925. After the $K^{th}$ template ($T_{K1}$) for the first reference word is stored in template store 216, signal $K_1$ (waveform 1709) is obtained from comparator 357. AND gate 685 is enabled and pulse generator 687 produces an $S_{37}$ (waveform 1717) which increments word counter 340. Until word counter 340 is in its W+1 state, a high $W_2$ signal (waveform 1721) from comparator 341 and the pulse from pulse generator 689 enables AND gate 691 to provide an $E_{15}$ signal. Operation box 903 in FIG. 9 is entered responsive to control signal $E_{15}$ from AND gate 691 in logic 640 and the templates for the next reference word are formed in accordance with the flow chart of FIG. 9.

Figure 18:
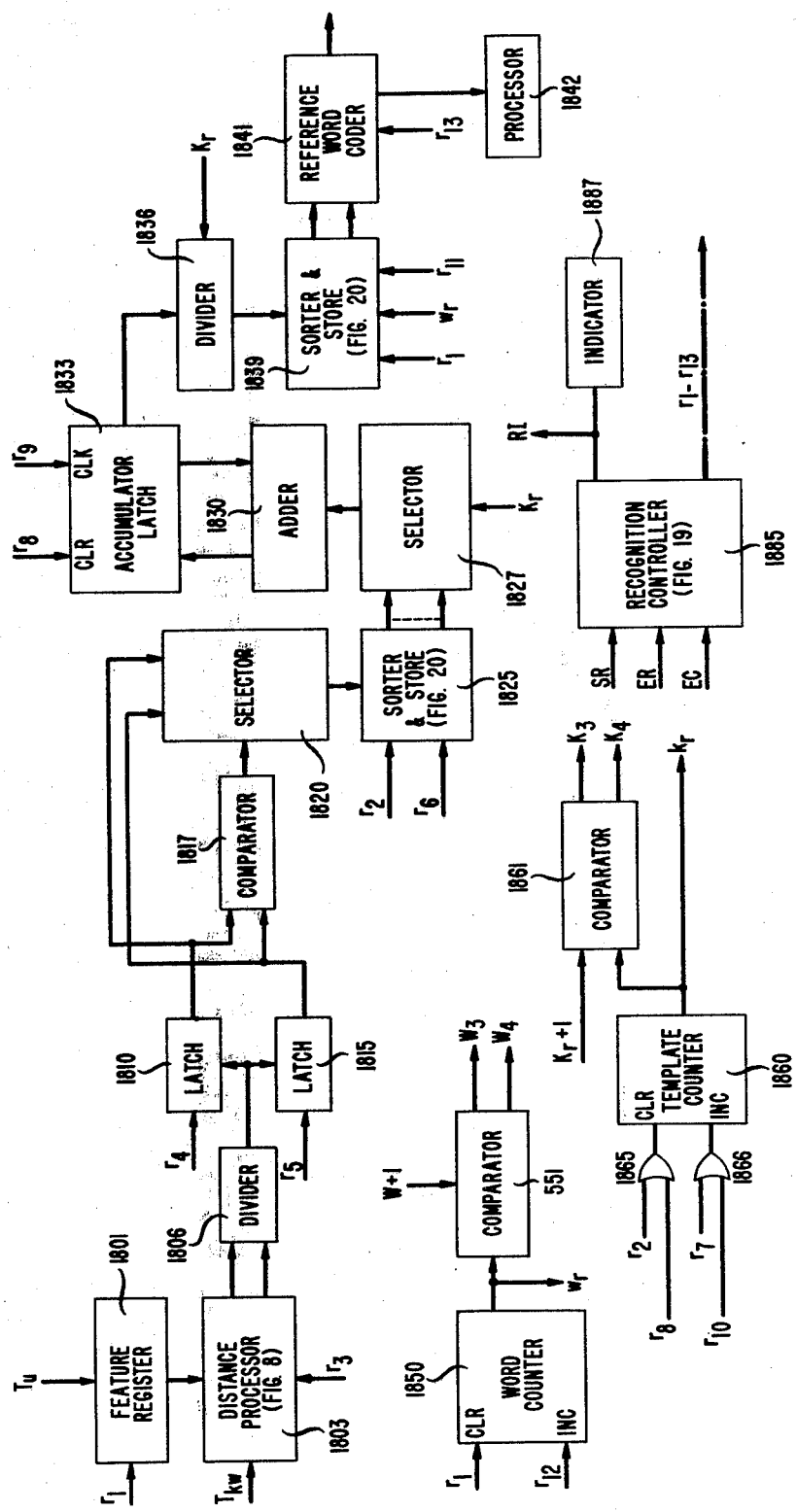
FIG. 18 shows a detailed block diagram of the recognizer apparatus of FIG. 1.

The formation of the $K^{th}$ template of the last reference word W terminates the template generation mode and permits the enabling of the recognition mode as indicated in box 923. In logic 640 of FIG. 6, the output of AND gate 692 sets flip-flop 694 responsive to the pulse from pulse generator 689 and the $W_1$ signal (waveform 1719) obtained at time $t_{35}$ in FIG. 17 when word counter 340 is in its $W+1$ state. Since signal $W_1$ obtained from comparator 341 indicates the templates of the last reference word have been formed, the ER signal is supplied to recognition controller 1885 in FIG. 18 whereby the recognition mode logic of FIG. 18 is permitted to operate responsive to an externally applied SR pulse.

Figure 22:
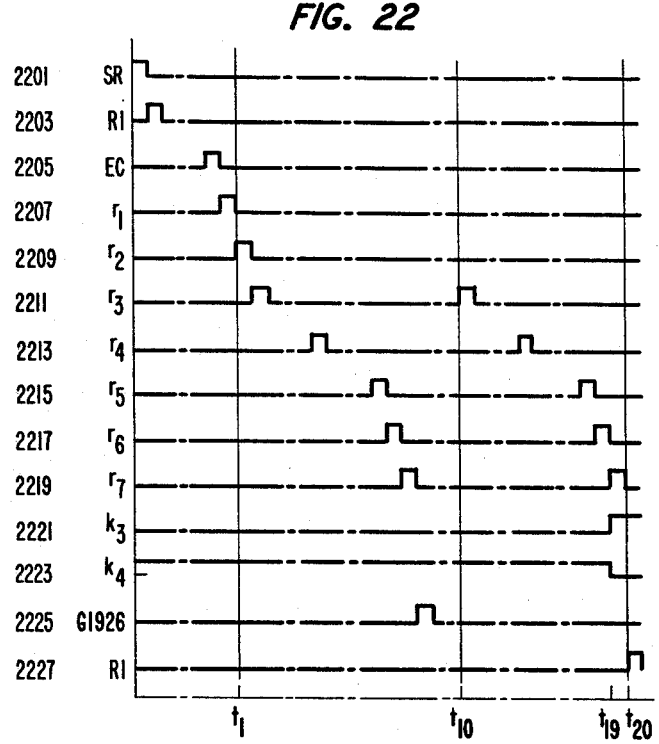
FIGS. 22 and 23 show waveforms useful in describing the operation of the block diagram of FIG. 18.

Recognition controller 1885 controls the operation of the recognition mode and is shown in detail in FIG. 19. During the recognition mode, an unknown utterance is supplied to telephone handset 201 in FIG. 1 after signal SR is obtained from an external source. Signal SR shown in waveform 2201 in FIG. 22 is applied to OR gate 1900 in FIG. 19 and triggers pulse generator 1901 when the ER signal from training mode controller 218 is high and a high $\overline{IR}$ signal is obtained from flip-flop 1958. The $\overline{IR}$ signal is high at all times, except during the recognition mode so that interruption of a recognition mode is avoided. Pulse generator 1901 produces a high RI control pulse (waveform 2103), which pulse provides an idication to the speaker via indicator circuit 1887 that he may provide an utterance. The RI pulse from generator 1901 enables lowpass filter and sampler 203, A-to-D converter 204, LPC feature signal generator 205 and end point detector 206 in FIG. 2 so that a feature signal set $T_u$ is generated responsive to the unknown utterance.

After the utterance is completeed, signal EC (waveform 2205) from end point detector 206 triggers pulse generator 1905 in FIG. 19 and an $r_1$ control pulse (waveform 2207) is produced. The $r_1$ pulse clears word counter 1850 to its $w_r = 1$ state, sets flip-flop 1958 to enable the IR signal therefrom, and permits the transfer of the unknown utterance feature signal set $T_u$ from generator 205 in FIG. 2 to feature signal register 1801 in FIG. 18. The $r_1$ pulse also triggers pulse generator 1901 at time $t_1$ in FIG. 22 via OR gate 1907 so that an $r_2$ pulse (waveform 2209) is produced.

Responsive to the $r_2$ pulse, template counter 1860 is cleared to its $k_r = 1$ state via OR gate 1865. At this time, the template set $T_{11}$ addressed by template counter 1860 and word counter 1850 is obtained from template store 216 in FIG. 2. This template set $T_{11}$ and the unknown utterance feature signal set $T_u$ in register 1801 are applied to distance processor 1803. Processor 1803, for example, may comprise microprocessor 880 of FIG. 8 having the distance signal processing program set forth in Fortran language in Appendix B herein permanently stored in stored program control 809. In accordance with the program in Appendix B, direct memory access 805 of processor 1803 receives the unknown utterance feature signal set $T_u$ from feature signal register 1801 via lead 830, and the template signal $T_{11}$ from template store 216 in FIG. 2 via lead 832. At the trailing edge of the $r_2$ pulse, a $r_3$ control pulse (waveform 2211) is generated by pulse generator 1913. The $r_3$ pulse is supplied to processor 880 via lead 840 and processor unit 1803 computes the signal $D_T(T_u, T_{11})/N_T$, the average frame distance to the terminating frame $N_T$ of the unknown utterance. When signal $D_T(T_u, T_{11})/N_T$ is available to interface adapter 801, a signal ED1 is supplied from interface adapter 801 via lead 850 to pulse generator 1915 which produces an $r_4$ control pulse (waveform 2213). The $r_4$ is applied to latch 1810 so that the $D_T(T^u, T_{11})/N_T$ signal from lead 852 is transferred to latch 1810.

At this time, processor 1803 is operative to determine the intermediate frame $N_I$ of the unknown utterances such that the total energy in the unknown utterance speech signal from frame $N_I$ to terminal frame $N_T$ is a predetermined portion of the total speech energy in the unknown utterance. The average frame distance signal $D_I(T_u, T_{11})/NI$ is then computed in processor 1803. When signal $D_I(T_u, T_{11})/N_I$ is available to interface adapter 801, and ED2 signal from lead 854 of the interface adapter triggers pulse generator 1917 in FIG. 19. The $r_5$ control signal from pulse generator 1917 (waveform 2215) then permits the transfer of the $D_I(T_u, T_{11})/N_I$ signal from lead 852 in FIG. 8 to latch 1815 in FIG. 18. Comparator 1817 receives the $D_T(T_u, T_{11})/N_T$ signal from latch 1810 and the $D_I(T_u, T_{11})/N_I$ signal from latch 1815. In the event that $D_I(T_u, T_{11})/N_I < D_T(T_u, T_{11})/N_T$, due to extraneous noise in the terminal portion of the unknown utterance, the high output signal is supplied to selector 1820 from comparator 1817 causes selector 1820 to connect the output of latch 1815 to sorter and store 1825. If $D_T(T_u, T_{11})/N_I \geq D_T(T_u, T_{11})/N_T$, the output of latch 1810 is connected to the input of sorter and store 1825 via selector 1820. Comparator 1817 and selector 1820 are operative to transfer the smaller of the signals in latches 1810 and 1815 to sorter and store 1825.

Sorter and store 1825 is operative to select a set of minimum distance signals from the sequence of first word distance signals $D(T_u, T_{11})$, $D(T_u, T_{21})$, ..., $D(T_u, T_{k1})$ and to arrange the selected distance signals in ascending order. FIG. 20 shows a detailed block diagram of sorter and store 1825. Referring to FIG. 20, latches 2002, 2012, 2022 and 2032 store the selected distance signals. Each of comparators 2004, 2014, 2024 and 2034 is adapted to compare the distance signal from selector 1820 to the distance signal previously entered into latch associated with the comparator. Responsiveto to the output of comparators 2014, 2024 and 2034, latches 2012, 2022, and 2032 are enabled to enter the distance signal from selector 1820, or the distance signal from the preceding latch, or to retain the distance signal previously stored therein.

Assume, for purposes of illustration, that the sequence of reference word w distance signals from selector 1820 is $D(T_u, T_{1w})=1$, $D(T_u, T_{2w})=3$, $D(T_u, T_{3w})=3$, $D(T_u, T_{4w})=2$, and $D(T_u, T_{5w})=5$. Latches 2002, 2012, 2022 and 2032 are initially set to the largest possible value (LPV) responsive to control signal $r_2$ prior to the formation of distance signals for reference word w in processor 1803. When signal $D(T_u, T_{1w})$ is applied to comparators 2004, 2014, 2024 and 2034, the CM1, CM2, CM3 and CM4 outputs are all high since $D(T_u, T_{1w})=1$ is less than the LPV initially stored in latches 2002, 2012, 2022 and 2032 by control pulse $r_2$.

Selector 2010 connects the output of latch 2002 to the input of latch 2012 responsive to the low output of AND gate 2016. Similarly, selector 2020 connects the output of latch 2012 to the input of latch 2022, and selector 2030 connects the output of latch 2022 to the input of latch 2032. Each of gates 2008, 2018, 2028 and 2038 is enabled when control pulse $r_6$ (waveform 2217) is applied thereto. Latch 2002 receives the $D(T_u, T_{1w})=1$ signal which is stored therein. Latches 2012, 2022, and 2032 receive and store the maximum value LPV signal from the immediately preceding latch.

The $D(T_u, T_{2w})=3$ signal is then applied from selector 1820 so that the $\overline{CM1}$ output of comparator 2004 becomes high while the CM2, CM3, and CM4 outputs of comparators 2014, 2024 and 2028 remain high. Responsive to the high $\overline{CM1}$ and CM2 signals from comparators 2014 and 2024, selector 2010 connects the output of selector 1820 to the input of latch 2012. Since AND gates 2026 and 2036 are not enabled, selector 2020 connects the output of latch 2012 to the input of latch 2022, and selector 2030 connects the output of latch 2022 of the input of latch 2032.

The next $r_6$ pulse enables AND gate 2018, and the distance signal $D(T_u, T_{2w})=3$ is placed into latch 2012 via enabled selector 2010. Since signal CM1 is low, AND gate 2008 is not enabled and the $D(T_u, T_{1w})=1$ signal remains in latch 2002. Latch 2022 receives the LPV signal from latch 2012, and latch 2032 receives the LPV signal from latch 2022 since both signals CM3 and CM4 are high. When distance signal $D(T_u, T_{3w})=3$ is applied from selector 1820, the $\overline{CM1}$ output of comparator 2004 remains high since $D(T_u, T_{1w})=1$ in latch 2002 is less than $D(T_u, T_{3w})=3$. The $\overline{CM2}$ output of comparator 2014 becomes high since $D(T_u, T_{2w})=3$ stored in latch 2012 is equal to $D(T_u, T_{3w})=3$ from selector 1820. Signals CM3 and CM4 remain high because the maximum value stored in latches 2022 and 2032 is greater than $D(T_u, T_{3w})=3$.

Upon the occurrence of the next $r_6$ pulse, latches 2002 and 2012 remain unchanged because signals CM1 and CM2 are low. Latch 2022, however, owever, is enabled by AND gate 2028 to receive the $D(U, T_{3w})=3$ signal from selector 1820 responsive to the high $\overline{CM2}$ and CM3 signals applied to AND gate 2026. Latch 2032 is enabled by AND gate 2038 and receives the LPV signal from latch 2022 via selector 2030 because signals CM3 and CM4 are both high.

When the $D(T_u, T_{4w})=2$ signal is supplied by selector 1820, the $\overline{CM1}$, CM2, CM3 and CM4 outputs of comparators 2004, 2014, 2024 and 2034 are high. This is so because latch 2002 contains the $D(T_u, T_{1w})=1$ signal which is less than 2, while latches 2012, 2022 and 2032 contain $D(T_u, T_{2w})=3$, $D(T_u, T_{3w})=3$ and the LPV signal, respectively, which are greater than $D(T_u, T_{4w})=2$. AND gate 2016 is enabled by the high $\overline{CM1}$ and CM2 signals whereby selector 2010 connects the output of selector 1820 to the input of latch 2012. AND gates 2026 and 2036 are not enabled so that selector 2020 connects the output of latch 2012 to the input of latch 2022 and selector 2030 connects the output of latch 2022 to the input of latch 2032. Responsive to the next $r_6$ pulse, latch 2012 is enabled by AND gate 2018 and the $D(T_u, T_{4w})=2$ signal is inserted therein via selector 2010. Latches 2022 and 2032 are also enabled by gates 2028 and 2038 and the $D(T_u, T_{2w})=3$ signal from latch 2012 is inserted into latch 2022 while the $D(U, T_{3w})=3$ signal from latch 2022 is put into latch 2032. At this time, latches 2002, 2012, 2022 and 2032 contain distance signals 1, 2, 3 and 3, respectively.

The next distanc signal $D(U, T_{5w})=5$ is then supplied to sorter and store of FIG. 20. The $\overline{CM1}$, $\overline{CM2}$, $\overline{CM3}$ and $\overline{CM4}$ signals are high since the $D(U, T_{5w})=5$ signal is larger than the distance signals stored in the latches 2002, 2012, 2022, and 2032 in FIG. 20. None of these latches is enabled responsive to the next $r_6$ pulse because gates 2008, 2018, 2028 and 2038 are not enabled. Consequently, the distance signals in the latches of FIG. 20 remain unchanged. If a subsequent distance signal $D(T_u, T_{kw})$ less than 3, e.g. 1.5, is applied from selector 1820, it replaces one of the distance signals in latches 2001, 2012, 2022, and 2032 of FIG. 20 and the largest distance signal is removed from latch 2032.

The 1.5 distance signal is greater than the 1 signal in latch 2022 but less than the signals in latches 2012, 2022 and 2032. Thus, signals $\overline{CM1}$, CM2, CM3 and CM$ become high. As a result, latch 2002 is not enabled by AND gate 2008 and the 1 signal remains therein. Selector 2010 connects the output of selector 1820 to latch 2012 responsive to the high $\overline{CM1}$ and CM2 signals applied to AND gate 2016. Upon the next $r_6$ signal pulse, the 1.5 distance signal is inserted into latch 2012. Since neither gate 2026 nor gate 2036 is enabled, the 2 signal in latch 2012 is transferred to latch 2022 via selector 2020 and the 3 signal in latch 2022 is transferred to latch 2032 via selector 2030. After the last distance signal for reference word w is supplied to the sorter and store circuit of FIG. 20, latches 2002, 2012, 2022 and 2032 contain the 4 lowest valued distance signals for the reference word in ascending order. It is to be understood that the circuit of FIG. 20 may be modified by one skilled in the art to that a smaller or greater number of selected distance signals may be sorted and stored therein.

In the circuit of FIG. 19, a sequence of $r_3$ to $r_7$ control pulses are obtained from pulse generators 1913, 1915, 1917, 1919, and 1921 to control the distance signal generation and sorting for each template of a reference word. After the operation of sorter and store 1825 is completed for each template responsive to pulse $r_6$, pulse generator 1921 is triggered, and an $r_7$ control pulse (waveform 2219) are produced. The $r_7$ pulse is applied to template counter 1860 via OR gate 1866, whereby the template counter is incremented so that the next template signal set in template store 216 is addressed. Until template counter 1860 is in its $K_r+1$ state, a high $K_4$ signal (waveform 2223) obtained from comparator 1861. The pulse from pulse generator 1923, responsive to trailing edge of $r_7$ pulse, and the high $K_4$ signal from comparator 1861 enable AND gate 1926 (waveform 2225) so that the next sequence of $r_3$ through $r_7$ pulses is produced. In this manner, each template of the reference word is evaulated by distance signal processing and sorting. When template counter 1860 is in its $K_r+1$ state at time $t_{20}$ in FIG. 22 just after the $K^{th}$ template for the reference word has been evaulated, an $R_1$ signal is obtained from AND gate 1925 responsive to the high $K_3$ signal (waveform 2221) from comparator 1861 and the pulse from pulse generator 1923.

Figure 23:

The $R_1$ signal occurs when all templates of a reference word have been evaluated and the four least distance values are stored in latches 2002, 2012, 2022, and 2032 of sorter and store 1825. The average of the four distance signals in these latches of sorter and store 1825 are then obtained by means of adder 1830, accumulator latch 1833 and divider 1836. The $R_1$ signal initiates the averaging by triggering pulse generator 1930 which produces an $r_8$ control pulse shown in waveform 2301 of FIG. 23. The $r_8$ pulse is applied to the clear inputs of template counter 1860 and accumulator latch 1833, and is operative to clear template counter 1860 to its $k_r=1$ state and to clear latch 1833 to zero. The trailing edge of the $r_8$ pulse also triggers pulse generator 1934 so that a $r_9$ control pulse (wvefor 2303) is generated. At this time, the $k_r=1$ output of counter 1960 switches selector 1827 to its first state, whereby selector 1827 connects the output of latch 20002 to one input of adder 1830. The other input to adder 1830 is supplied from the output of accumulator latch 1833. The sum signal from adder 1803 is applied to the input of latch 1833 responsive to pulse $r_9$ so that accumulator latch 1833 contains the distance signal from latch 2002.

Responsive to the trailing edge of the $r_9$ pulse, pulse generator 1936 generates an $r_{10}$ control pulse (waveform 2305) which causes template counter 1860 to be incremented to its $k_r=2$ state. Comparator 1861 produces a high $K_4$ signal (waveform 2309) since the output code from counter 1860 is less than the $K_r+1=5$ input to the comparator. When pulse generator 1938 provides an output pulse at the trailing edge of the $r_{10}$ pulse, AND gate 1941 (waveform 2311) is enabled and a second sequence of $r_9$ and $r_{10}$ pulses is produced. Responsive to the second $r_9$ pulse, the output of latch 2012 is added to the contents of accumulator latch 1833 via selector 2040, and the sum is placed in the accmulator latch. The $r_9$ and $r_{10}$ pulse sequence is repeated until the sum of the distance signals from latches 2001, 2012, 2022 and 2032 is accumulated in latch 1833, AND gate 1940 (waveform 2313) is then enabled by the high $K_3$ signal (waveform 2307) from comparator 1861 and the pulse from pulse generator 1938. Divider 1936 then causes the accumulated sum from latch 1833 to be divided by $K_r=4$ so that the average ($\hat{D}_1$) of the selected distance signals for reference word $w=1$ is formed. The average $\hat{D}_1$ is representative of the similarity between unknown utterance and reference word $w=1$.

The average of the selected distance signals of reference word $w=1$ is then placed in sorter and store 1839 which is operaive to store the set of lowest valued $\hat{D}_w$ signals from divider 1836 in ascending order and the correspondig reference word numbers obtained from word counter 1850. The sorting of signals $\hat{D}_w$ in sorter and store 1839 is substantially similar to the operation already described with respect to sorter and store 1825 except that the latches of sorter and store 1839 are initially set to their largest possible values by control pulse $r_1$ applied to latches 2002, 2012, 2022 and 2032 in FIG. 20 instead of pulse $r_2$ and control pulse $r_{11}$ enables gates 2008, 2018, 2028 and 2038, and clocks latches 2002, 2012, 2022 and 2032 instead of pulse $r_6$.

Control pulse $r_{11}$ (waveform 2315) is produced by pulse generator 1944 when AND gate 1940 in FIG. 6 is enabled upon the termination of the averaging of the selected distance signals for reference word $w=1$. The average signal $\hat{D}_1$ from divider 1836 is less than the largest possible value signals initially placed in latches 2002, 2012, 2022 and 2032 by the $r_1$ pulse at the beginning of the recognition mode. The CM1, CM2, CM3 and CM4 outputs of comparators 2004, 2014, 2024 and 2034 are high. Consequently, gate 2008 is enabled by the $r_{11}$ pulse and the CM1 signal. Signal $\hat{D}_1$ is then placed in latch 2002. AND gate 2046 is also enabled by pulse $r_{11}$ and the high CM1 output from comparator 2014 so that the $w_r=1$ signal is placed in latch 2042. Latches 2052, 2062 and 2072 which were initially set to zero code by the preceding $r_1$ pulse, receive the zero code from the preceding latch since gates 2054, 2064 and 2074 remain disabled.

After the $\hat{D}_1$ signal is placed in latch 2002 and the corresponding $w_r=1$ signal is inserted into latch 2042, the trailing edge of pulse $r_{11}$ triggers pulse generator 1946 and an $r_{12}$ control pulse (waveform 2317) is generated. Ther $r_{12}$ pulse increments word counter 1850 to its $w_r=2$ state and triggers pulse generator 1948. Since counter 1850 is not in its last word state ($w_r=W$), comparator 1851 which compares the $w_r$ signal from counter 1850 to a constant $W+1$ signal provides a high $W_4$ output (waveform 2321). AND gate 1951 is enabled by the high $W_4$ signal and the pulse from pulse generator 1948 whereby an $R_2$ signal (waveform 2323) is obtained. The $R_2$ signal occurs after all tempates from template store 216, $T_{11}, T_{21}, \ldots, T_{k1}$, for the first refernece word have been processed in the circuit of FIG. 18 and an average distance signal $\hat{D}_1$ is stored in sorter and store 1839 with the corresponding reference word code. Signal $R_2$ retriggers pulse generator 1909 so that the recognition circuit of the circuit of FIG. 18 is enabled to process the template signals of the second reference word.

Figure 21:
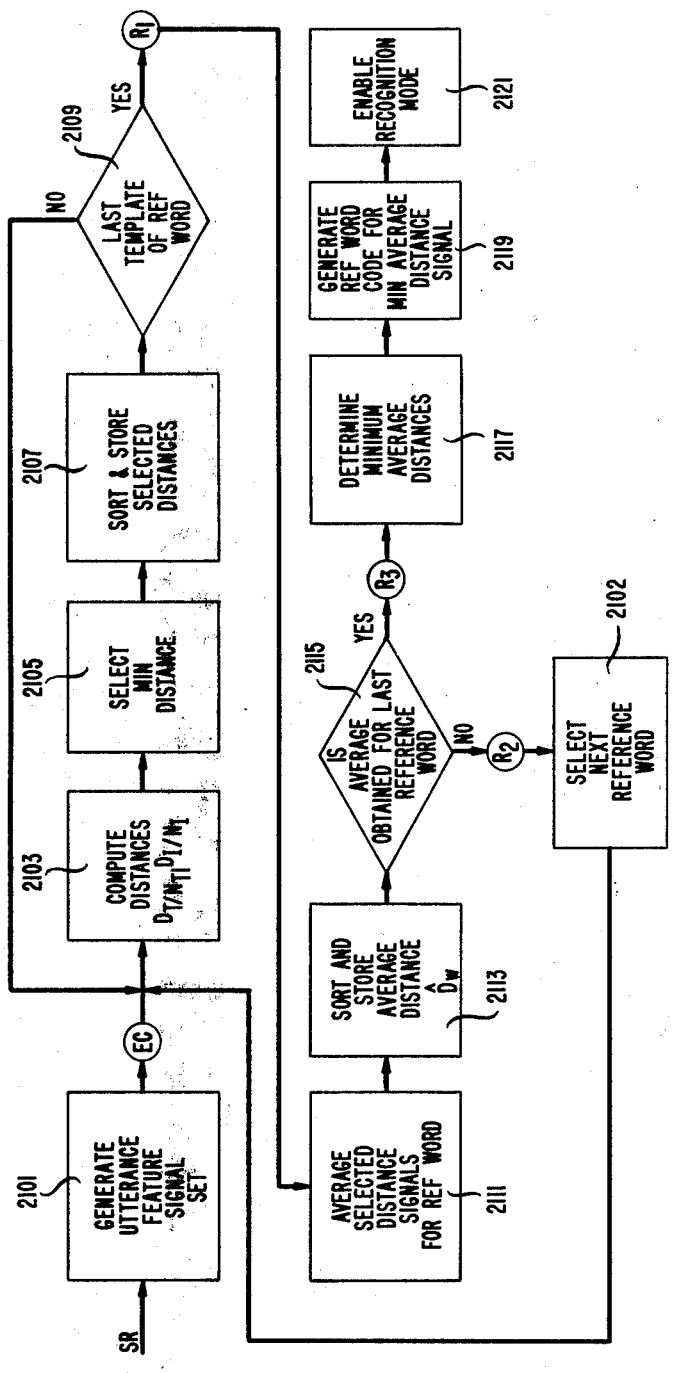
FIG. 21 shows a flow diagram of the recognition mode process performed in FIG. 18.

The processing of the template signals for the reference words in the recognition mode is shown in the flow chart of FIG. 21. As described with respect to the template signals of the first reference word, the distance signals are generated in processor 1803 as indicated in operation box 2103. The minimum distance signal for each template is selected as indicated in box 2105 and the selected minimum distance signal is sorted and stored as shown in box 2107. Until the last ($K^{th}$) distance signal $D(T_u, T_{Kw})$ is appropriately sorted and stored, decision box 2109 causes the circuit of FIG. 18 to process the next template signal of the current reference word via operation boxes 2103, 2105 and 2107. After the last distance signal $D(T_u, T_{Kw})$ for the reference word has been processed by sorter and store circuit 1825, the average of the sorted seleced distance signals, $\hat{D}_w$, is determined as shown in operation box 2111 and the average distance signal is sorted with respect to the previous average distance signals $\hat{D}_1, \hat{D}_2, \ldots, \hat{D}_{w-1}$ stored in sorter and store circuit 1839 as indicated in operation box 2113. Until the last reference word processing is complete, an $R_2$ signal is obtained in accordance with decision box 2115. The next reference word is selected in box 2102, and the processing of the next reference word for recognition in accordance with boxes 2103, 2105, 2107, 2109, 2111, 2113 and 2115 is provided by the circuit of FIG. 18.

After the average of selected distance signal $\hat{D}_W$ for the last reference word W is processed by sorter and store 1839, word counter 1850 is incremented to its $w_r=W+1$ state by control pulse $r_{12}$ (waveform 2317 at time $t_{10}$) from pulse generator 1946 and comparator 1851 provides a high $W_3$ signal (waveform 2319). Responsive to the high $W_3$ signal and the pulse from pulse generator 1948, AND gate 1950 is enabled and the $R_3$ signal therefrom (waveform 2325) triggers pulse generator 1954. The $r_{13}$ control pulse (waveform 2327) from pulse generator 1954 is applied to reference word coder 1841 which then generates a coded signal corresponding to the reference word with the minimum average distance signal $\hat{D}_{w\ min}$ in latch 2042 of sorter and store 1839. These operations are indicated in boxes 2117 and 2119 of FIG. 21. The $\hat{D}_{w\ min}$ reference word coded signal is then applied to processor 1842 as the reference word corresponding to the unknown utterance.

Alternatively, the reference word signals in latches 2042, 2052, 2062 and 2072 are transferred to reference word coder 1841 and the signals therefrom are applied to processor 1842 for syntactic and semantic analysis as is well known in the art. Responsive to the trailing edge of the r$_{13}$ pulse, pulse generator 1956 provides a pulse which resets flip-flop 1958. The high $\overline{\text{IR}}$ output signal obtained therefrom then permits a new recognition mode or a new training mode to be initiated by training controller 218 or recognition controller 1885.

The invention has been described with reference to a particular illustrative embodiment. It is to be understood, however, that various changes and modifications may be made by those skilled in the art without departing from the spirit and scope of the invention. For example, the various hardware logic aarrangements shown in the figures may be replaced by microprocessor apparatus including processing instructions permanently stored therein.

APPENDIX A

TRAINING MODE DISTANCE PROCESSING

```
C
C    WARPPAT--DYNAMIC TIME WARP PLUS DISTANCE
C
         SUBROUTINE DPWARP (R,MM,T,NN,DENDAV,DINTAV)
         DIMENSION R(9,75),T(9,75)
C
C
C    R IS XIJ FEATURE SET CONTAINING FEATURES FOR REFERENCE
C    MM IS NUMBER OF FRAMES OF REFERENCE
C    T IS ANOTHER XIJ FEATURE SET CONTAINING FEATURES
         FOR TEST
C        CAN ALSO BE FEATURES FOR ANOTHER REFERENCE
         FOR CLUSTERING
C    NN IS NUMBER OF FRAMES OF TEST
C    DENDAV IS AVERAGE DISTANCE TO ENDING FRAME
C    DINTAV IS AVERAGE DISTANCE TO INTERMEDIATE FRAME
C
         COMMON /DWDATA/ TMIN,TMAX,NINT,NFC
C
C    TMIN IS MINIMUM AVERAGE DISTANCE FOR REJECTION THRESHOLD
C    TMAN IS MAXIMUM AVERAGE DISTANCE FOR REJECTION THRESHOLD
C        FOR CLUSTERING SET TMIN=TMAX=50. TO ELIMINATE
         REJECTION THRESHOLD
C    NINT IS INTERMEDIATE (BACKUP) FRAME
C    NFC IS EARLY RETURN FRAME (NOT USED HERE)
C
         DIMENSION D (100),DCU(100)
         DOUBLE PRECISION VP(100),XMLT,VPIM1
         INTEGER DL/0/
         DATA XLRG/1000./
         DATA K/2/
         IMAX(I)=MINO(K*(I-1)+1+DL,(I-NN)/K+MM+DL,MM)
         IMIN(I)=MAXO((I-1)/K+1-DL,K*(I-NN)+MM-DL,1)
         DEND=0.
         IF(MM.GE.K*NN.OR.NN.GE.K*MM)GO TO 300
C IT=1
         IR1=IMIN(1)
         IR2=IMAX(1)
         VP(1)=0.
         XMLT=1.
         XMND=1000.
         DO 60 IR=IR1,IR2
         CALL DIST(R,IR,T,1,DCU(IR))
         IF(DCU(IR).LT.XMND) XMND=DCU(IR)
         VP(1)=VP(1)+XMLT
         XMLT=XMLT*3DO
60       CONTINUE
         NFC=1
         DO 65 IR=IR2+1,MM
         DCU(IR)=XLRG
65       CONTINUE
         DO 200 IT=2,NN
         XMND=XLRG
         IR1P=IR1
         IR2P=IR2
         IR1=IMIN(IT)
         IR2=IMAX(IT)
         D1=XLRG
         D2=XLRG
         IF(IR1-1.GE.IR1P)D1=DCU(IR1-1)
         IF(IR1-2.GE.IR1P)D2=DCU(IR1-2)
         DO 30 IR=IR1,IR2
         CALL DIST(R, IR, T, IT, D(IR))
30       CONTINUE
         VP(IT)=0.
         XMLT=1.
         IMP=IR1-IR1P
         VPIM1=VP(IT-1)
         IF(IMP.EQ.0)GO TO 56
         DO 55 IM=1,IMP
```

APPENDIX A-continued
TRAINING MODE DISTANCE PROCESSING

```
                VPIM1=VPIM1/3DO/
55              CONTINUE
56              CONTINUE
                DO 100 IR=IR1,IR2
                DO=DCU(IR)
                DI=D2
                LPTH=2
                IF(D1-D2)10,11,11
10              LPTR=1
                DI=D1
11              IF(DO-DI)12,12,20
12              CONTINUE
                IF(IR.GT.IR2P)GO TO 20
                KVPM=DMOD(VPIM1,3DO)
                IF(KVPM.EQ.0)GO TO 20
                LPTH=0
                DI=DO
20              CONTINUE
                VPIM1=VPIM1/3DO
                DI=DI+D(IR)
                IF(XMND-DI)50,50,51
51              XMND=DI
                IRMN=IR
50              CONTINUE
                D2=D1
                D1=DO
                DCU(IR)=DI
                VP(IT)=VP(IT)+DFLOAT(LPTH)*XMLT
                XMLT=XMLT*3DO
100             CONTINUE
                IF(IT.GT.NINT) GO TO 85
                IF(IT.EQ.NINT) XSAV=XMND
                THR1=(TMIN+((TMAX-TMIN)/(FLOAT (NN)-1))
                *FLOAT(IT-1))*MN
85              CONTINUE
                IF(XMND.CT.THR1) GO TO 300
                NFC=IT
90              CONTINUE
                IF(IR1.LE.IR1P)GO TO 92
                DO 91 IR=IR1P,IR1-1
                DCU(IR)=XLRG
91              CONTINUE
                IF(IR2.GE.IR2P)GO TO 93
                DO 92 IR=IR2+1,IR2P
                DCU(IR)=XLRG
92              CONTINUE
93              CONTINUE
200             CONTINUE
                DINTAV=XSAV/FLOAT(NINT)
                DENDAV=XMND/FLOAT(NN)
                RETURN
300             DENDAV=1000./FLOAT(NN)
                DINTAV=1000./FLOAT(NINT)
                RETURN
                END
C
C  DISTPAT--DISTANCE ROUTINE USING AUTOCORRELATION OF A'S
C
        SUBROUTINE DIST(CR,IR,CT,IT,DST)
        DIMENSION CR(9,75),CT(9,75)
        PARAMETER M=8,ME=M+1
C
C  CR=REFERENCE SET OF FEATURES
C  IR=FRAME OF REFERENCE FOR DISTANCE CALCULATION
C  CT=TEST SET OF FEATURES
C  IT=FRAME OF TEST FOR DISTANCE CALCULATION
C  DST=DISTANCE BETWEEN FRAME IR OF REFERENCE AND
        FRAME IT OF TEST
C
C  CR=NORMALIZED CORRELATION FUNCTION OF A'S
        OF REFERENCE FRAME
C  CR(I)=2*COR(I)/COR(O) WHERE COR IS TRUE
        CORRELATION OF A'S
C  RC=OR(1,IR)
C  TC=LOG RESIDUAL ERROR OF TEST FRAME
C  TC=CT(1,IT)
C
C  DST=RC+LOG(ACOR DOT R)-TC
C  FORM R DOT T AND STORE IN PR1
C
                RC=CR(1,IR)
```

APPENDIX A-continued
TRAINING MODE DISTANCE PROCESSING

```
            TC=CT(1,IT)
            PR1=1.
            DO 10 I=2,ME
10          PR1=PR1+CR(I,IR)*CT(I,IT)
            IF(PR1.LT.1.E-5)PR1=1.E-5
            DST=ALOG(PR1)+RC-TC
            RETURN
            END
```

APPENDIX B
RECOGNITION DISTANCE PROCESSING

```
C
C   RECDIST--RECOGNITION DISTANCE ROUTINE
C
         SUBROUTINE RECDIST(R,M,U,N,DENDAV,NINT,DINTAV)
         DIMENSION R(9,75),U(9,75)
C
C   R=REFERENCE TEMPLATE SET (TJW) OF FEATURES
C   M=NUMBER OF FRAMES OF REFERENCE
C   U=UNKNOWN WORD SET OF FEATURES
C   N=NUMBER OF FRAMES OF UNKNOWN
C   DENDAV=AVERAGE DISTANCE TO END OF UNKNOWN WORD
C   NINT=INTERMEDIATE (BACKUP) FRAME FOR DISTANCE
C   DINTAV=AVERAGE DISTANCE TO INTERMEDIATE FRAME
C
         DIMENSION X(75)
C
C   CALCULATE INTERMEDIATE (BACKUP) POINT FROM ZEROTH
         CORRELATION
C
                ETOT=0.
                EMX=0.
                DO 110 I=1,N
                ETOT=ETOT+U(1,I)
                X(I)=ETOT
                EMX=AMAX1(EMX,U(1,I))
110              CONTINUE
                THRSH=0.001*EMX
                NINT=N
115              CONTINUE
                NINT=NINT-1
                IF(ETOT-X(NINT)-THRSH)115,117,117
117              CONTINUE
C
C NINT IS INTERMEDIATE (BACKUP) FRAME
C
                CALL DPWARP(R,M,U,N,DENDAV,DINTAV)
                RETURN
                END
                C
                C WARPPAT--DYNAMIC TIME WARP PLUS DISTANCE
                C
                SUBROUTINE DPWARP (R,MM,T,NN,DENDAV,DINTAV)
                DIMENSION R(9,75),T(9,75)
C
C
C   R IS XIJ FEATURE SET CONTAINING FEATURES FOR REFERENCE
C   MM IS NUMBER OF FRAMES OF REFERENCE
C   T IS ANOTHER XIJ FEATURE SET CONTAINING FEATURES
         FOR TEST
C        CAN ALSO BE FEATURES FOR ANOTHER REFERENCE
         FOR CLUSTERING
C   NN IS NUMBER OF FRAMES OF TEST
C   DENDAV IS AVERAGE DISTANCE TO ENDING FRAME
C   DINTAV IS AVERAGE DISTANCE TO INTERMDIATE FRAME
C
         COMMON /DWDATA/ TMIN,TMAX,NINT,NFC
C
C   TMIN IS MINIMUM AVERAGE DISTANCE FOR REJECTION THRESHOLD
C   TMAN IS MAXIMUM AVERAGE DISTANCE FOR REJECTION THRESHOLD
C        FOR CLUSTERING SET TMIN=TMAX=50. TO ELIMINATE
         REJECTION THRESHOLD
C   NINT IS INTERMEDIATE (BACKUP) FRAME
C   NFC IS EARLY RETURN FRAME (NOT USED HERE)
C
                DIMENSION D(100),DCU(100)
                DOUBLE PRECISION VP(100),XMLT,VPIM1
                INTEGER DL/0/
                DATA XLRG/1000./
```

APPENDIX B-continued
RECOGNITION DISTANCE PROCESSING

```
                    DATA K/2/
                    IMAX(I)=MINO(K*(I−1)+1+DL,(I−NN)/K+MM+DL,MM)
                    IMIN(I)=MAXO((I−1)/K+1−DL,K*(I−NN)+MM−DL,1)
                    DEND=0.
                    IF(MM.GE.K*NN.OR.NN.GE.K*MM)GO TO 300
      C IT=1
                    IR1=IMIN(1)
                    IR2=IMAX(1)
                    VP(1)=0.
                    XMLT=1.
                    XMND=1000.
                    DO 60 IR=IR1,IR2
                    CALL DIST(R,IR,T,1,DCU(IR))
                    IF(DCU(IR).LT.XMND) XMND=DCU(IR)
                    VP(1)=VP(1)+XMLT
                    XMLT=XMLT*3D0
      60            CONTINUE
                    NFC=1
                    DO 65 IR=IR2+1,MM
                    DCU(IR)=XLRG
      65            CONTINUE
                    DO 200 IT=2,NN
                    XMND=XLRG
                    IR1P=IR1
                    IR2P=IR2
                    IR1=IMIN(IT)
                    IR2=IMAX(IT)
                    D1=XLRG
                    D2=XLRG
                    IF(IR1−1.GE.IR1P)D1=DCU(IR1−1)
                    IF(IR1−2.GE.IR1P)D2=DCU(IR1−2)
                    DO 30 IR=IR1,IR2
                    CALL DIST(R, IR, T, IT, D(IR))
      30            CONTINUE
                    VP(IT)=0.
                    XMLT=1.
                    IMP=IR1−IR1P
                    VPIM1=VP(IT−1)
                    IF(IMP.EQ.0)GO TO 56
                    DO 55 IM=1,IMP
                    VPIM1=VPIM1/3D0
      55            CONTINUE
      56            CONTINUE
                    DO 100 IR=IR1,IR2
                    D0=DCU(IR)
                    DI=D2
                    LPTH=2
                    IF(D1−D2)10,11,11
      10            LPTH=1
                    DI=D1
      11            IF(D0−DI)12,12,20
      12            CONTINUE
                    IF(IR.GT.IR2P)GO TO 20
                    KVPM=DMOD(VPIM1,3D0)
                    IF(KVPM.EQ.0)GO TO 20
                    LPTH=0
                    DI=D0
      20            CONTINUE
                    VPIM1=VPIM1/3D0
                    DI=DI+D(IR)
                    IF(XMND−DI)50,50,51
      51            XMND=DI
                    IRMN=IR
      50            CONTINUE
                    D2=D1
                    D1=D0
                    DCU(IR)=DI
                    VP(IT)=VP(IT)+DFLOAT(LPTH)*XMLT
                    XMLT=XMLT*3D0
      100           CONTINUE
                    IF(IT.GT.NINT) GO TO 85
                    IF(IT.EQ.NINT) XSAV=XMND
                    THR1=(TMIN+((TMAX−TMIN)/(FLOAT (NN)−1))
                    *FLOAT(IT−1))*NN
      85            CONTINUE
                    IF(XMND.GT.THR1) GO TO 300
                    NFC=IT
      90            CONTINUE
                    IF(IR1.LE.IR1P)GO TO 92
                    DO 91 IR=IR1P,IR1−1
                    DCU(IR)=XLRG
```

APPENDIX B-continued

RECOGNITION DISTANCE PROCESSING

```
91          CONTINUE
            IF(IR2.GE.IR2P)GO TO 93
            DO 92 IR=IR2+1,IR2P
            DCU(IR)=XLRG
92          CONTINUE
93          CONTINUE
200         CONTINUE
            DINTAV=XSAV/FLOAT(NINT)
DEN-
DAV=XMND/-
FLOAT(NN)
            RETURN
300         DENDAV=1000./FLOAT(NN)
            DINTAV=1000./FLOAT(NINT)
            RETURN
            END
C
C   DISTPAT--DISTANCE ROUTINE USING AUTOCORRELATION OF A'S
C
      SUBROUTINE DIST(CR,IR,CT,IT,DST)
      DIMENSION CR(9,75),CT(9,75)
      PARAMETER M=8,ME=M+1
C
C   CR=REFERENCE SET OF FEATURES
C   IR=FRAME OF REFERENCE FOR DISTANCE CALCULATION
C   CT=TEST SET OF FEATURES
C   IT=FRAME OF TEST FOR DISTANCE CALCULATION
C   DST=DISTANCE BETWEEN FRAME IR OF REFERENCE AND
         FRAME IT OF TEST
C
C   CR=NORMALIZED CORRELATION FUNCTION OF A'S
         OF REFERENCE FRAME
C   CR(I)=2C*COR(I)/COR(0) WHERE COR IS TRUE
         CORRELATION OF A'S
C   RC=CR(1,IR)
C   TC=LOG RESIDUAL ERROR OF TEST FRAME
C   TC=CT(1,IT)
C
C   DST=RC+LOG(ACOR DOT R)-TC
C   FORM R DOT T AND STORE IN PR1
C
            RC=CR(1,IR)
            TC=CT(1,IT)
            PR1=1.
            DO 10 I=2,ME
10          PR1=PR1+CR(I,IR)*CT(1,IT)
            IF(PR1.LT.1.E-5)PR1=1.E-5
            DST=ALOG(PR1)+RC-TC
            RETURN
            END
```

We claim:

1. A circuit for recognizing an unknown utterance as one of a set of reference words comprising means responsive to each of a plurality of utterances of a reference word for generating a set of signals representative of the features of said utterance; means responsive to the feature signal sets of each reference word for generating at least one temple signal, each template signal being representative of a group of said reference word feature signal sets; means responsive to the unknown utterance for generating a set of signals representative of the features of said unknown utterance; means jointly responsive to said unknown utterance feature signal set and each reference word template signal for forming a set of signals each representative of the similarity between said unknown utterance feature signal set and said reference word template signal; characterized in that selection means (130) are responsive to the similarlity signals for each reference word to select a plurality of said reference word similarity signals; averaging means (135) are adapted to form a signal corresponding to the average of said selected similarlity signals for each reference word; and identifying apparatus (140, 145) is responsive to the average similarity signals for said reference words to identify said unknown utterance as the most similar reference word.

2. A circuit for recognizing an unknown utterance as one of a set of reference words according to claim 1 characterized in that the template signal generating means (112) further comprises means (222, 224, 225, 226, 228, 230) for successively partitioning said reference word feature signal sets into clusters of feature signal sets, the feature signal sets of each cluster having a predetermined degree of similarity; and means (600, 230, 216) for identifying a feature signal set in each cluster as the template signal representative of all feature signal sets in said cluster.

3. A circuit for recognizing an unknown utterance as one of a set of reference words according to claim 2 wherein each feature signal set generating means comprises means for producing prediction parameter signals representative of the utterance; said similarity signal generating means comprises means jointly responsive to the prediction parameter signals of the unknown utterance and the prediction parameter sigals of each reference word template signal for producing a signal representative of the distance between said unknown utterance prediction parameter signals and said reference word template prediction parameter signals; characterized in that said selection means (130) further comprises means (1825) for selecting a plurality of the smallest distance signals for each reference word, said averaging means (135) comprises means (1830 1833, 1836) for forming a signal representative of the average of said selected distance signals for each reference word; and said identifying apparatus (140, 145) comprises means (1839, 1891) responsive to the average distance signals formed for all reference words for identifying the unknown utterance as the reference word having the least average distance signal.

4. A circuit for recognizing an unknown utterance as one of a set of reference words according to claim 3 characterized in that said partitioning means (224, 225, 226, 228, 230) further comprises means (222, 224, 493) responsive to the feature signal sets of each reference word for generating and storing a set of signals corresponding to the distances between pairs of said reference word feature signal sets; means (225, 226, 228, 505, 587) responsive to said stored distance signals for determining the centermost of said reference word feature signal sets and for identifying a first group of said sets which are within a predetermined distance of said centermost set; means (225, 226, 230, 232, 234, 505, 600) operative repetitively for forming successive groups of feature signal sets having a predetermined degree of similarity including means (226, 230, 505) responsive to said stored distance signals for determining the centermost set of the immediately preceding group of feature signal sets; means (225, 232, 234, 600) for identifying the feature signal sets of said preceding group which are within said predetermined distance of said preceding group centermost set as members of the next succesive group; means (225, 600) responsive to all feature signal sets of a preceding group being within said predetermined distance of said preceding group centermost set for identifying said preceding group as a cluster of feature signal sets having a predetermined degree of similarity.

5. A circuit for recognizing an utterance as one of a set of reference words according to claim 4 wherein said template signal identifying means is further characterized by means (216, 230, 640) for identifying the centermost feature signal set of said cluster as the template signal for said cluster of feature signal sets.

6. A circuit for recognizing an unknown utterance as one of a set of reference words according to claim 5 wherein said means for producing a signal representative of the distance between said unknown utterance prediction parameter signals and said template prediction parameter signals is further characterized in that means (205) are responsive to the unknown utterance to determine the number of frames to the endpoint frame of said unknown utterance; means (880, 1806) are adapted to generate a first signal corresponding to the average frame distance between the unknown utterance prediction parameter signals and said template signal prediction parameter signals until said endpoint frame, to determine the unknown utterance intermediate frame at which the unknown utterance speech signal energy from said intermediate frame to said endpoint frame is a predetermined portion of the total unknown utterance speech signal energy, and to generate a second signal corresponding to the average frame distance between said unknown utterance prediction parameter signals and said template prediction parameter signals until said intermediate frame; and means (1817, 1820) are responsive to said first and second signals to select the minimum of said first and second signals as said distance representative signal.

7. A circuit for recognizing an unknown utterance as one of a set of reference words according to claim 6 wherein said distance signal generating and storing means comprises means for storing the distance signals for each reference word in a storage matrix of J rows and J columns; and said centermost set determining means is characterized by means (702-1 through 702-J) responsive to the distance signals of each column of said matrix for selecting the maximum distance signal of said column; means (720) responsive to said selected maximum distance signals for determining the minimum of said selected maximum distance signals; and means (228, 230 for storing the row position of said determined minimum of the selected maximum distance signals to identify the centermost set.

8. A circuit for recognizing an unknown utterance as one of a set of reference words according to claim 7 characterized in that said means (1825) for selecting the smallest distance signals for each reference word further comprises means for successively receiving reference word distance signals from said distance signal generating means (1803, 1806, 1817, 1820); means (2002, 2012, 2022, 2032) for storing a set of minimum value distance signals in ascending order; means (2004, 2014, 2024, 2034) for comparing the distance signal from said receiving means with each of the distance signals stored in said distance signal storing means (2002, 2012, 2022, 2032); means (e.g., 2020, 2026, 2028) responsive to the operation of each comparing means (e.g., 2024) for replacing the distance signal in said distance signal storing means (e.g., 2022) with said received distance signal if said received distance signal is smaller than the distance signal in said distance signal storing means (e.g., 2022) and greater than the distance signal in the next lower order distance storing means (e.g., 2012), for retaining the distance signal in said distance signal storing means (e.g., 2022) if said received distance signal is greater than the distance signal in said distance signal storing means (e.g., 2022), and for transferring the distance signal in the next lower order distance signal storing means (e.g., 2012) to said distance signal storing means (e.g., 2022) if said received distance signal is smaller than the distance signals in both the next lower order distance signal storing means (e.g., 2012) and said distance signal storing means (e.g., 2022).

9. A circuit for recognizing an unknown utterance as one of a set of reference words according to claim 3, wherein said distance representative signal producing means is further characterized in that means (205) are responsive to said unknown utterance to determine the number of frames in said utterance to the endpoint frame thereof; means (880, 1806) are operative to generate a first signal corresponding to the average frame distance between the unknown utterance prediction parameter signals and said template prediction parameter signals until said endpoint frame, to determine the unknown utterance intermediate frame at which the unknown utterance speech signal energy from said intermediate frame to said endpoint frame is a predetermined portion of the total speech signal energy of said unknown utterance, and to generate a second signal corresponding to the average frame distance between said unknown utterance prediction parameter signals and said template prediction parameter signals until said intermediate frame; and means (1817, 1820) are adapted to select the smaller of said first and second signals as said distance representative signal.

10. A method of recognizing an unknown utterance as one of a set of reference words comprising the steps of generating a set of feature signals representative of each of a plurality of utterances of each reference word; generating at least one template signal for each reference word responsive to the feature signal sets of said reference word, each template signal being representative of a group of said reference word feature signal sets; responsive to the unknown utterance, generating a set of signals representative of the features of said unknown utterance; jointly responsive to said unknown utterance feature signal set and each reference word template signal, forming a set of signals each representative of the similarity between said unknown utterance feature signal set and said template signal; characterized in that a plurality of similarity signals for each reference word is selected; a signal corresponding to the average of each reference word selected similarity signals is formed; and responsive to the average signals for all reference words, the unknown utterance is identified as the most similar reference word.

11. A method for recognizing an unknown utterance as one of a set of reference words according to claim 10 wherein said template signal generating step comprises successively partitioning said reference word feature signal sets into clusters of feature signal sets, the feature signal sets of each cluster having a predetermining degree of similarity; and identifying a feature signal set in each cluster as a template signal representative of all feature signal sets in said cluster.

12. A method for recognizing an unknown utterance as one of a set of reference words according to claim 11 wherein said feature signal set generating step comprises producing prediction parameter signals representative of the utterance; and said similarity signal generating step comprises producing a signal representative of the distance between the unknown utterance prediction parameter signals and the reference word template prediction parameter signals jointly responsive to the prediction parameter signals of the unknown utterance and the prediction parameter signals of each reference word template characterized in that the smallest distance signals for each reference word are selected; a signal representative of the average of the selected distance signals for each reference word is formed; and responsive to the average distance signals formed for all reference words, the unknown utterance is identified as the reference word having the least average distance signal.

13. A method for recognizing an unknown utterance as one of a set of reference words according to claim 12 wherein said partitioning step is further characterized in that a set of signals corresponding to the distances between pairs of said reference word feature signal sets is generated and stored; responsive to the stored distance signals, the centermost set of the reference word feature signal sets is determined and a first group of said feature signal sets which are within a predetermined distance of said centermost set is identified; successive groups of unclustered feature signal sets having a predetermined degree of similarity are formed by determining the centermost set of the preceding group of feature signal sets from the stored distance signals and identifying the feature signal sets of said preceding group which are within the predetermined distance of said preceding group centermost set as members of the next successive group; responsive to all feature signal sets of a formed group being within the predetermined distance of the group centermost set, identifying the formed group as a cluster of feature signal sets having a predetermined degree of similarity.

14. A method for recognizing an unknown utterance as one of a set of reference words according to claim 13 wherein said template signal identification step is characterized in that the centermost feature signal set of said cluster is stored as the template signal for said cluster of feature signal sets.

15. A method for recognizing an unknown utterance as one of a set of reference words according to claim 14 wherein said step of producing a signal representative of the distance between the unknown utterance prediction parameter signals and the reference word template prediction parameter signals is characterized in that the number of frames to the endpoint frame of the unknown utterance is determined; a first signal corresponding to the average frame distance between the unknown utterance prediction parameter signals and the template prediction parameter signals until said endpoint frame is generated; the unknown utterance intermediate frame at which the unknown utterance speech signal energy from said intermediate frame to said endpoint frame is a predetermined portion of the total unknown utterance speech signal energy is determined; a second signal corresponding to the average frame distance between the unknown utterance prediction parameter signals and said template prediction parameter signals until said intermediate frame is generated; and the minimum of said first and second signals is selected as said distance representative signal.

16. A method for recognizing an unknown utterance as one of a set of reference words according to claim 15 wherein said distance signal generating and storing step includes storing the distance signals for each reference word in a storage matrix of J rows and J columns; and said centermost set determining step is characterized in that the maximum distance signal in each column of said matrix is selected; responsive to said selected maximum distance signals, the minimum of said selected maximum distance signals is determined; and signal corresponding to the row position of said determined minimum of the selected maximum distance signals is stored to identify the centermost set.

17. A speech recognition circuit for identifying an unknown utterance as one of a set of reference words comprising means responsive to each of a plurality of utterances of a reference word for generating a first signal representative of the prediction parameters of said utterance; means responsive to the first signals of each reference word for generating at least one template signal for said reference word, each template signal being representative of a group of the reference word first signals; means responsive to the unknown utterance for generating a second signal representative of the prediction parameters of said unknown utterance; means jointly responsive to the template signals of each reference word and the second signal for forming a set of signals each representative of the distance between said second signal and said reference word template signal; and means responsive to said reference word distance signals for identifying said unknown utterance as the reference word having the minimum distance signals characterized in that said template signal generating means (112) further comprises means (222, 224)

responsive to the first signals of each reference word for generating and storing a set of signals each representative of the distance between a pair of said reference word first signals; means (222, 225, 226, 228, 230) responsive to said stored distance signals for successively partitioning the first signals of each reference word into clusters, the first signals of each cluster having a predetermined degree of similarity; and means (216, 230, 600) responsive to said distance signals for determining the centermost first signal of each cluster and for identifying said centermost first signal as the cluster template signal.

18. A speech recognition circuit for identifying an unknown utterance as one of a set of reference words according to claim 17 characterized in that said partitioning means further comprises means (225, 226, 228, 505, 587) responsive to said stored distance signals for determining the centermost of said first signals and a first group of first signals which are within a predetermined distance of said centermost first signal; means (225, 226, 230, 232, 505, 600) responsive to said first group distance signals for successively forming groups of first signals having a predetermined degree of similarity including means (702-1 through 702-J, 720, 225, 232, 234, 600) responsive to the stored distance signals of said reference word for determining the centermost first signal of the immediately preceding group and for identifying the first signals of the immediately preceding group which are within said predetermined distance of the centermost first signal of the immediately preceding group as memebers of the next group of first signals; means (225, 600) responsive to all first signals of a formed group being within the predetermined distance of said formed group centermost first signal for identifying the first signals of said formed group as members of a cluster of first signals having a predetemined degree of similarity.

19. A speech recognition circuit for identifying an unknown utterance as one of a set of reference words according to claim 18 further characterized by means (216, 230, 646) for storing the centermost first signal of the cluster as the template signal for said cluster of first signals.

20. A method for identifying an unknown utterance as one of a set of reference words comprising the steps of generating a first signal representative of the prediction parameters of each of a plurality of utterances of a reference word; generating at least one template signal for each reference word responsive to the reference word first signals, each template signal being representative of a group of the reference word first signals; generating a second signal representative of the prediction parameters of said unknown utterance; jointly responsive to the template signals of each reference word and the second signal, forming a set of signals each representative of the distance between said second signal and said reference word template signal; responsive to the distance signals of all reference words, identifying the unknown utterance as the reference word having the minimum distance signals characterized in that said template signal generation for each reference word includes generating and storing a set of signals each representative of the distance between a pair of reference word first signals responsive to the first signals of said reference word; and successively partitioning the first signals of said reference word into clusters responsive to the stored reference word distance signals, the first signals of each cluster having a predetermined degree of similarity; determining the centermost first signal of each cluster responsive to said stored reference word distance signals; and identifying said centermost first signal as the cluster template signal.

21. A method for identifying an unknown utterance as one of a set of reference words according to claim 20 characterized in that the successive partitioning further includes determining the centermost of said first signals of said reference word and identifying the first group of said reference word first signals which are within a predetermined distance of said determined centermost first signal responsive to said reference word stored distance signals; successively forming groups of first signals having a predetermined degree of similarity comprising determining the centermost first signal of the immediately preceding group from the stored distance signals and identifying the first signals of the immediately preceding group which are within a predetermined distance of the centermost first signal of the immediately preceding group as members of the next group of first signals; and responsive to all first signals of the immediately preceding group being within the predetermined distance of saidimmediately preceding group centermost first signal, identifying the immediately preceding group as a cluster of first signals having said predetermined degree of similarity.

22. A method for identifying an unknown utterance as one of a set of reference words according to claim 21 further characterized in that the centermost first signal of said cluster is identified and stored as the template signal for said cluster.

23. A speech recognition circuit for identifying an unknown utterance as one of a set of reference words comprising: means responsive to each of a plurality of utterances of a reference word for generating a first signal representative of the prediction parameters of said utterance; means responsive to the first signals of each reference word for generating at least one template signal for each reference word, each template signal being representative of a group of reference word first signals; means responsive to the unknown utterance for generating a second signal representative of the prediction parameters of said unknown utterance; means jointly responsive to the template signals of each reference word and the second signal for forming a set of a signals each representative of the distance between the second signal and said reference word template signal; and means responsive to said reference word distance signals for identifying said unknown utterance as the reference word having the minimum distance signals; characterized in that said distance representative signal forming means (1803, 1806, 1810, 1815, 1817, 1820) further comprises means (205) responsive to said unknown utterance for determining the number of frames to the endpoint frame of the unknown utterance; means (880, 1806) for generating a third signal corresponding to the average frame distance between said second signal and said template prediction parameter signals until said endpoint frame of said unknown utterance, for determining the intermediate frame of the unknown utterance at which the speech signal energy of the unknown utterance from said intermediate frame to said endpoint frame is a predetermined portion of the total speech signal energy of the unknown utterance, and for generating a fourth signal corresponding to the average frame distance between said second signal and said template prediction parameter signals until said intermediate frame; and means (1817, 1820) for selecting the minimum of said third and fourth signals as said distance representative signal.

24. A speech recognition circuit for identifying an unknown utterance as one of a set of reference words according to claim 23 characterized in that said means (130, 135, 140, 145) for identifying said unknown utterance as the reference word having the minimum distance signals further comprises means (130) responsive to said distance representative signals of each reference word for selecting a plurality of said reference word smallest distance representative signals; means (135) for forming a signal corresponding to the average of said reference word selected distance representative signals; and means (140, 145) responsive to the average selected distance representative signals for all reference words for identifying the unknown utterance as the reference word having the minimum average distance representative signal.

25. A method for identifying an unknown utterance as one of a set of reference words comprising the steps of generating a first signal representative of the prediction parameters of each of a plurality of utterances of each reference word; generating at least one template signal for each reference word responsive to the reference word first signals, each template signal being representative of a group of the reference word first signals; generating a second signal representative of the prediction parameters of said unknown utterance; jointly responsive to the template signals of each reference word and the second signal, forming a set of signals each representative of the distance between said second signal and said reference word template signal; responsive to the distance signals of all reference words, identifying the unknown utterance as the reference word having the minimum distance signals characterized in that the step of forming a set of signals each representative of the distance between said second signal and said reference template signal comprises the steps of determining the endpoint frame of the unknown utterance; generating a third signal corresponding to the average frame distance between said second signal and said template prediction parameter signals until said endpoint frame; determining the intermediate frame of said unknown utterance at which the unknown utterance speech signal energy from said intermediate frame to said endpoint frame is a predetermined portion of the total speech signal energy of said unknown utterance; generating a fourth signal corresponding to the average frame distance between the second signal and the template prediction parameter signals until said intermediate frame; and selecting the minimum of said third and fourth signals as said distance representative signal.

26. A method for identifying an unknown utterance as one of a set of reference words according to claim 25 further characterized in that said step of identifying the unknown utterance as the reference word having the minimum distance signals further comprises the steps of: selecting a plurality of smallest distance signals for each reference word; forming a signal corresponding to the average of said reference word selected smallest distance signals; and identifying the unknown utterance as the reference word having the minimum average distance signal responsive to the average distance signals of all reference words.

* * * * *

UNITED STATES PATENT AND TRADEMARK OFFICE
CERTIFICATE OF CORRECTION

PATENT NO. : 4,181,821

DATED : January 1, 1980

INVENTOR(S) : Frank C. Pirz and Lawrence R. Rabiner

It is certified that error appears in the above-identified patent and that said Letters Patent are hereby corrected as shown below:

Column 6, line 37, "thershold" should read --threshold--. Column 7, line 28, "is" should read --in--. Column 11, line 8, "pule" should read --pulse--; line 61, "seocond" should read --second--. Column 13, line 15, "otuput" should read --output--; line 63, "wavefore" should read --waveform--; line 68, "wavefore" should read --waveform--. Column 15, line 15, "generator" should read --pulse generator--. Column 16, line 46, "702-2" should read --702-3--. Column 17, line 65, "232" should read --332--. Column 18, line 62, that portion of the formula reading "$X_{j1}$" should read --$X_{j1}$--. Column 19, line 65, "Spulse" should read --$S_{29}$ pulse--. Column 22, line 19, after "$S_{29}$," insert --$S_{30}$,--. Column 23, line 28, "gate 684" should read --pulse generator 682--. Column 24, line 54, "wavform" should read --waveform--. Column 25, line 40, "completeed" should read --completed--; line 48, "1901" should read --1909--; line 51, "$r_2$pulse" should read --$r_2$ pulse--.

Column 26, line 8, "$T^u$" should read --$T_u$--; line 47, "Responsiveto" should read --Responsive--. Column 27, line 37, after "however" delete "owever,"; line 66, "distanc" should read --distance--. Column 28, line 12, "2022" (first occurrence) should read --2002--; line 13, "CM$" should read --CM4--; line 18, "$r_6$signal" should read --$r_6$ signal--. Column 29, line 3, "wvefor" should read waveform--; line 4, "1960" should read --1860--; line 6, "20002" should read --2002--; line 16, "$K_4$signal" should read --$K_4$ signal--; line 26, "2001" should read --2002--; line 28, after "$K_3$" insert a space; line 31, "1936" should read --1836--; line 38, "lis" should read --1 is--; line 39, "operaive" should read --operative--; line 41, "correspondig" should read --corresponding--; line 47, "$r_1$applied" should read

UNITED STATES PATENT AND TRADEMARK OFFICE
CERTIFICATE OF CORRECTION

PATENT NO. : 4,181,821

DATED : January 1, 1980

INVENTOR(S) : Frank C. Pirz and Lawrence R. Rabiner

It is certified that error appears in the above-identified patent and that said Letters Patent are hereby corrected as shown below:

--$r_1$ applied--; line 57, "$r_1$pulse" should read --$r_1$ pulse--. Column 30, line 5, "Ther" should read --The r--; line 8, "$w_r$signal" should read --$w_r$ signal--; line 12, "$R_2$signal" should read --$R_2$ signal--; line 14, "refernece" should read --reference--; line 37, "seleced" should read --selected--. Column 32, line 6, "aarrangements" should read --arrangements--. Column 33, line 35, "*MN" should read --*NN--. Column 35, line 65 "INTERMDIATE" should read --INTERMEDIATE--. Column 39, lines 11, 12, and 13, "DEN
DAV=XMND/-
FLOAT(NN)" should read --DENDAV=XMND/FLOAT(NN)--. Column 46, line 23, "saidimmediately" should read --said immediately--.

Signed and Sealed this

Twenty-second Day of July 1980

[SEAL]

Attest:

SIDNEY A. DIAMOND

Attesting Officer

Commissioner of Patents and Trademarks